(12) United States Patent
Haruta et al.

(10) Patent No.: US 12,263,722 B2
(45) Date of Patent: Apr. 1, 2025

(54) GLASS RUN AND METHOD OF MANUFACTURING THE SAME

(71) Applicant: NISHIKAWA RUBBER CO., LTD., Hiroshima (JP)

(72) Inventors: Akira Haruta, Hiroshima (JP); Tomonori Miyata, Hiroshima (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 413 days.

(21) Appl. No.: 17/578,422

(22) Filed: Jan. 18, 2022

(65) Prior Publication Data
US 2022/0227212 A1    Jul. 21, 2022

(30) Foreign Application Priority Data

Jan. 20, 2021  (JP) .................................. 2021-007533
Nov. 15, 2021 (JP) .................................. 2021-185791

(51) Int. Cl.
*B60J 10/76*  (2016.01)
*B60J 10/15*  (2016.01)
*B60J 10/265* (2016.01)

(52) U.S. Cl.
CPC ............... *B60J 10/76* (2016.02); *B60J 10/15* (2016.02); *B60J 10/265* (2016.02)

(58) Field of Classification Search
CPC .......... B60J 10/76; B60J 10/15; B60J 10/265; B60R 13/04
USPC ....................................................... 49/479.1
See application file for complete search history.

(56) References Cited

U.S. PATENT DOCUMENTS

| | | | | |
|---|---|---|---|---|
| 4,736,981 A | * | 4/1988 | Barton | B60J 10/40 296/201 |
| 4,910,918 A | * | 3/1990 | Naples | B60J 10/21 49/490.1 |
| 5,085,902 A | | 2/1992 | Yada et al. | |
| 8,458,959 B2 | * | 6/2013 | Ohtake | B60J 10/86 49/502 |
| 8,991,102 B2 | * | 3/2015 | Minagawa | B60J 10/86 49/489.1 |
| 9,845,001 B1 | * | 12/2017 | Kojima | B60J 5/0402 |
| 10,112,468 B2 | * | 10/2018 | Miyata | B60J 10/16 |

(Continued)

FOREIGN PATENT DOCUMENTS

CN    115285032 A  *  11/2022
DE    102010001468 A1     8/2011
(Continued)

*Primary Examiner* — Jerry E Redman
(74) *Attorney, Agent, or Firm* — Holtz, Holtz & Volek PC

(57) ABSTRACT

A glass run includes an installation member and a body. The installation member couples to a frame of a door of an automobile. The body forms a channel to receive a door glass. An outer-cabin side of the installation member is extended in a direction away from the door to form an extended part. A base composed of hard resin higher in rigidity than the extended part attaches a decorative film to the extended part. The decorative film alongside of the base is bent toward an interior of the automobile, to cover an end surface of the extended part. Parts of upper and lower ends of the decorative film are removed by predetermined distance FL1, FL2 from the end surface of the extended part, to reduce a width in an upper and lower direction of a remainder part of the decorative film.

9 Claims, 16 Drawing Sheets

(56) References Cited

U.S. PATENT DOCUMENTS

| | | | |
|---|---|---|---|
| 10,150,356 B2 | 12/2018 | Takahashi et al. | |
| 11,376,938 B2 * | 7/2022 | Morihara | B60J 10/21 |
| 11,577,593 B2 * | 2/2023 | Kuroki | B60J 10/76 |
| 2004/0177562 A1 * | 9/2004 | Deguchi | B60J 5/00 |
| | | | 49/475.1 |
| 2013/0232881 A1 * | 9/2013 | Adachi | B60J 10/16 |
| | | | 49/490.1 |
| 2014/0059940 A1 * | 3/2014 | Eguchi | B60J 10/21 |
| | | | 49/479.1 |
| 2019/0193541 A1 | 6/2019 | Takeda | |
| 2021/0229539 A1 * | 7/2021 | Morihara | B60J 10/76 |
| 2022/0227212 A1 * | 7/2022 | Haruta | B60J 10/76 |

FOREIGN PATENT DOCUMENTS

| | | | | |
|---|---|---|---|---|
| FR | 3128412 A1 * | 4/2023 | | B60J 10/265 |
| JP | H02267040 A | 10/1990 | | |
| JP | H08119044 A | 5/1996 | | |
| JP | H08300953 A | 11/1996 | | |
| JP | H10324198 A | 12/1998 | | |
| JP | 4727306 B2 | 4/2011 | | |
| JP | 2014196051 A | 10/2014 | | |
| JP | 2017159845 A | 9/2017 | | |
| JP | 2019112010 A | 7/2019 | | |
| KR | 101926870 B1 | 12/2018 | | |

\* cited by examiner

GLASS RUN AND METHOD OF MANUFACTURING THE SAME

REFERENCE TO RELATED APPLICATIONS

This application claims the benefit under 35 USC § 119 of JP Patent Applications JP 2021-007533 filed Jan. 20, 2021 and JP 2021-185791 filed Nov. 15, 2021, the entire disclosure of which is incorporated herein by reference.

BACKGROUND OF THE INVENTION

The present invention relates to a glass run which couples to a door of an automobile and includes an extended part with an outer-cabin side surface covered with a decorative film, a coupling structure of the glass run, and a method of manufacturing the glass run.

FIG. 11 illustrates a door (front door) 1 of an automobile including a frame 3, and a door (rear door) 2 of the automobile including a frame 4. FIG. 12 illustrates traditional glass runs 10, 20 (see, for example, Japanese Unexamined Patent Application Publication No. 08-300953). The glass run 10 is partially covered with a decorative film F, and couples to the frame 3. The glass run 20 is partially covered with the decorative film F, and couples to the frame 4. A shaded part in FIG. 12 indicates a die-molded part.

The decorative film F, which partially covers the glass run 10 on the front door 1, is attached to an outer-cabin side surface of a decorative lip 12, and is continuously extended to cover an outer-cabin side surface of an extended part 13. The decorative lip 12 is formed on an outer-cabin side of an installation member 11 of the glass run 10, and is continuously extended toward a rear part of an automobile body to form the extended part 13. The extended part 13 extends from a rear end of an upper side on an upper corner part of the front door 1.

In the same manner, the decorative film F, which partially covers the glass run 20 on the rear door 2, is attached to an outer-cabin side surface of a decorative lip 22, and is continuously extended to cover an outer-cabin side surface of an extended part 23. The decorative lip 22 is formed on an outer-cabin side of an installation member 21 of the glass run 20, and is continuously extended toward a front part of the automobile body to form the extended part 23. The extended part 23 extends from a front end of an upper side on an upper corner part of the rear door 2.

The glass run 10 couples to the front door 1 and the glass run 20 couples to the rear door 2 with the extended part 13 and the extended part 23 faced each other on a parting portion between the front door 1 and the rear door 2.

This configuration gives an optical illusion that a sash molding on the front door 1 and a sash molding on the rear door 2 are continuous, and improves appearance.

FIG. 13 illustrates cross-sectional shapes of the extended parts 13, 23. The extended parts 13, 23 are formed by extruding extrusion-molding material alongside of the decorative film F, and then covering an end surface 13*a* of the extended part 13 and an end surface 23*a* of the extended part 23 with the die-molding material.

An end surface Fa of the decorative film F is aligned with the end surface 13*a*. The end surface Fa is aligned with the end surface 23*a*. The decorative films F in FIG. 13 are provisionally painted in black, but the decorative films F in real products are generally painted in colors other than black.

Such glass runs 10, 20 known in the art have the problems described below. The extended part 13 has a cover member 14 attached to an end, and the extended part 23 has a cover member 24 attached to an end. The cover members 14, 24, which are faced each other, are colored black and exposed. The cover members 14, 24 form two black strips between the front door 1 and the rear door 2 when the doors 1, 2 are seen from an exterior of the automobile with the doors 1, 2 in closed positions, and degrade appearance.

Some glass runs known in the art have caps (illustration omitted), not the cover members 14, 24, fixed on the end surfaces of the extended parts (see, for example, Japanese Unexamined Patent Application Publication No. 2019-112010). Unfortunately, however, the caps form strips between the extended parts and the caps, interrupt continuous appearance of the decorative films F, and degrade appearance.

To solve the above problems, it is an object of the present invention to provide glass runs with continuous appearance improved between two adjacent decorative films on outer-cabin sides of the glass runs to allow for better appearance, a coupling structure of the glass runs, and a method of manufacturing the glass runs.

SUMMARY OF THE INVENTION

To achieve the above object, an aspect of the present invention provides a glass run (50, 70) for a door (1, 2) of an automobile, for guiding a door glass (G) in a frame (3, 4).

The glass run (50, 70) includes an installation member (51, 71), a body (52, 72), an extended part (53, 73), and a decorative film (F). The installation member (51, 71) couples to the frame (3, 4). The body (52, 72) forms a channel. The extended part (53, 73) is formed by extending an outer-cabin side of the installation member (51, 71) in a direction away from the door (1, 2) from an end of an upper side of the door (1, 2). The decorative film (F) is bent on an end of the extended part (53, 73) toward an inner-cabin side of the extended part (53, 73) from an outer-cabin side to cover an end surface (53*c*, 73*c*) of the extended part (53, 73).

In addition, according to an aspect of the present invention, the decorative film (F) has an upper end (F1) and a lower end (F2) bent to incline toward an interior of the automobile from an exterior or form arcs.

Also, part of the upper end (F1) and part of the lower end (F2) of the decorative film (F) are removed by predetermined distance (FL1, FL2) (width in a front and rear direction of cut-off parts (FK1, FK2) of the decorative film (F)) from the end surface (53*a*, 73*a*) of the extended part (53, 73) to reduce a width (FW1, FW2) in an upper and lower direction of a remainder part of the decorative film (F).

In addition, according to an aspect of the present invention, first ends of the cut-off parts (FK1, FK2) of the upper end (F1) and the lower end (F2) of the decorative film (F) are chamfered and formed into curved corner parts. The first ends are opposite second ends of the cut-off parts (FK1, FK2). The second ends are closer to the end surface (53*a*, 73*a*) of the extended part (53, 73).

In addition, according to an aspect of the present invention, the glass run (50, 70) further includes a base (90) which attaches the decorative film (F) to the extended part (53, 73). The base (90) is composed of hard resin higher in rigidity than the extended part (53, 73). The base alongside of the decorative film is bent on the end of the extended part (53, 73) toward the interior of the automobile from the exterior to cover the end surface (53*c*, 73*c*) of the extended part (53, 73).

In addition, according to an aspect of the present invention, the glass run (50, 70) further includes an insert panel

(91) embedded between the base (90), which is bent, and the end surface (53a, 73a) of the extended part (53, 73).

In addition, an aspect of the present invention provides a coupling structure of the glass run (50) to a front door (1) and the glass run (70) to a rear door (2). The structure includes a first extended part (53) of the glass run (50) and a second extended part (73) of the glass run (70). The first extended part (53) is extended toward a rear part of an automobile body from a rear end of an upper side of the front door (1). The second extended part (73) is extended toward a front part of the automobile body from a front end of an upper side of the rear door (2). The first extended part (53) and the second extended part (73) are faced each other on a parting portion between the front door (1) and the rear door (2).

In addition, an aspect of the present invention provides a method of manufacturing a glass run (50, 70) for a door (1, 2) of an automobile, for guiding a door glass (G) in a frame (3, 4). The glass run (50, 70) includes an installation member (51, 71), a body (52, 72), an extended part (53, 73), a decorative film (F), and a base (90). The installation member (51, 71) couples to the frame (3, 4). The body (52, 72) forms a channel. The extended part (53, 73) is formed by extending an outer-cabin side of the installation member (51, 71) in a direction away from the door (1, 2) from an end of an upper side of the door (1, 2). The base (90) attaches the decorative film (F) to the extended part (53, 73). The base (90) is composed of hard resin higher in rigidity than the extended part (53, 73). The base (90) alongside of the decorative film (F) is bent on an end of the extended part (53, 73) toward the interior of the automobile from the exterior to cover an end surface (53c, 73c) of the extended part (53, 73).

The method includes: forming the extended part (53, 73), alongside of the base (90) and the decorative film (F), by extrusion molding; making a first cut (M1) on the extended part (53, 73), the first cut (M1) extending by a predetermined length (L) from the end surface (53a, 73a) of the extended part (53, 73), the first cut (M1) being parallel to the decorative film (F); making a second cut (M2) on the extended part (53, 73), the second cut (M2) extending by a predetermined length (J) toward the exterior of the automobile from the interior; removing a cut-off part (K) as part of the extended part (53, 73) along the first cut (M1) and the second cut (M2); bending a remainder part (Z) of the extended part (53, 73) on an appropriate part of the remainder part (Z) toward the interior of the automobile; and subjecting an end surface (Za) of the remainder part (Z) to die molding to cover the end surface (Za) of the remainder part (Za).

In addition, an aspect of the present invention provides a method of manufacturing a glass run (50, 70) for a door (1, 2) of an automobile, for guiding a door glass (G) in a frame (3, 4). The glass run (50, 70) includes an installation member (51, 71), a body (52, 72), an extended part (53, 73), a decorative film (F), and a base (90). The installation member (51, 71) couples to the frame (3, 4). The body (52, 72) forms a channel. The extended part (53, 73) is formed by extending an outer-cabin side of the installation member (51, 71) in a direction away from the door (1, 2) from an end of an upper side of the door (1, 2). The base (90) attaches the decorative film (F) to the extended part (53, 73). The base (90) is composed of hard resin higher in rigidity than the extended part (53, 73). The base (90) alongside of the decorative film (F) is bent on an end of the extended part (53, 73) toward the interior of the automobile from the exterior to cover an end surface (53c, 73c) of the extended part (53, 73).

The method includes: forming the extended part (53, 73), alongside of the base (90) and the decorative film (F), by extrusion molding; making a first cut (M1) on the extended part (53, 73), the first cut (M1) extending by a predetermined length (L) from the end surface (53a, 73a) of the extended part (53, 73), the first cut (M1) being parallel to the decorative film (F); making a second cut (M2) on the extended part (53, 73), the second cut (M2) extending by a predetermined length (J) toward the exterior of the automobile from the interior; removing a cut-off part (K) as part of the extended part (53, 73) along the first cut (M1) and the second cut (M2); bending a remainder part (Z) of the extended part (53, 73) by a bending distance (S) toward the interior of the automobile, the bending distance (S) being (L) minus (T) (S=L−T), where (L) is a predetermined length and (T) is a distance of straight part; and subjecting an end surface (Za) of the remainder part (Z) to die molding to cover the end surface (Za) of the remainder part (Z).

In addition, an aspect of the present invention provides a method of manufacturing a glass run (50, 70) for a door (1, 2) of an automobile, for guiding a door glass (G) in a frame (3, 4). The glass run (50, 70) includes an installation member (51, 71), a body (52, 72), an extended part (53, 73), a decorative film (F), and a base (90). The installation member (51, 71) couples to the frame (3, 4). The body (52, 72) forms a channel. The extended part (53, 73) is formed by extending an outer-cabin side of the installation member (51, 71) in a direction away from the door (1, 2) from an end of an upper side of the door (1, 2). The decorative film (F) has an upper end (F1) and a lower end (F2) bent to incline toward the interior of the automobile from the exterior or form arcs. The base (90) attaches the decorative film (F) to the extended part (53, 73). The base (90) is composed of hard resin higher in rigidity than the extended part (53, 73). The base (90) alongside of the decorative film (F) is bent on an end of the extended part (53, 73) toward the interior of the automobile from the exterior to cover an end surface (53c, 73c) of the extended part (53, 73).

The method includes: forming the extended part (53, 73), alongside of the base (90) and the decorative film (F), by extrusion molding; making a first cut (M1) on the extended part (53, 73), the first cut (M1) extending by a predetermined length (L) from the end surface (53a, 73a) of the extended part (53, 73), the first cut (M1) being parallel to the decorative film (F); making a second cut (M2) on the extended part (53, 73), the second cut (M2) extending by a predetermined length (J) toward the exterior of the automobile from the interior; removing a cut-off part (K) as part of the extended part (53, 73) along the first cut (M1) and the second cut (M2); making cuts on part of the upper end (F1) and part of the lower end (F2) of the decorative film (F) by a predetermined distance (FL1, FL2) (width in a front and rear direction of cut-off parts (FK1, FK2) of the decorative film (F)) from the end surface (53a, 73a) of the extended part (53, 73); removing the cut-off parts (FK1, FK2) of the decorative film (F) to reduce a width (FW1, FW2) in an upper and lower direction of a remainder part (FZ1, FZ2) of the decorative film (F); bending the remainder part (FZ1, FZ2) of the decorative film (F) subjected to removal of the cut-off parts (FK1, FK2) of the decorative film (F) by a bending distance (S) toward the interior of the automobile; and subjecting an end surface (FZ1a, FZ2a) of the remainder part (FZ1, FZ2) of the decorative film (F) to die molding to cover the end surface (FZ1a, FZ2a) of the remainder part (FZ1, FZ2).

In addition, according to an aspect of the present invention, the method further includes chamfering first ends of the cut-off parts (FK1, FK2) of the upper end (F1) and the lower end (F2) of the decorative film (F) to form the first ends into curved corner parts. The first ends are opposite second ends of the cut-off parts (FK1, FK2). The second ends are closer to the end surfaces (53a, 73a) of the extended part (53, 73).

Symbols in parentheses show constituents or items corresponding to the drawings.

According to the present invention, the decorative film attached to the outer-cabin side of the extended part is bent on the end of the extended part toward the inner-cabin side of the extended part from the outer-cabin side to cover the end surface of the extended part. That is, the decorative film is exposed on a surface. The use of the decorative film leads to lower manufacturing cost and weight saving of products as compared with the use of metal moldings.

The decorative film exposed on the surface improves continuous appearance between the decorative film attached to the extended part on the front door and the decorative film attached to the extended part on the rear door when the decorative films are faced each other on the parting portion between the front door and the rear door. This allows for better appearance.

In other words, although cover members composed of die-molding material form two black strips on the ends of the extended parts of traditional glass runs (FIG. 13), the present invention prevents appearance of the black strips.

The present invention is more effective when applied around a center pillar of the automobile, on which the front door and the rear door are faced each other. This is because the center pillar is about level with human eye, and is more conspicuous than any other part.

In addition, the decorative film has the upper end and the lower end bent to incline toward the interior of the automobile from the exterior or form arcs. Also, the part of the upper end and the part of the lower end of the decorative film are removed by predetermined distance (FL1, FL2) from the end surface of the extended part to reduce the width in the upper and lower direction of the remainder part of the decorative film. This configuration prevents sharp-pointed parts or wrinkles on a bent part of the decorative film when the end of the extended part is bent toward the interior of the automobile from the exterior.

In addition, the first ends of the cut-off parts of the upper end and the lower end of the decorative film are chamfered and formed into curved corner parts. The first ends are opposite the second ends of the cut-off parts which are closer to the end surface of the extended part. This configuration further prevent the sharp-pointed parts or wrinkles.

In addition, the base composed of hard resin higher in rigidity than the extended part attaches the decorative film to the extended part, and stably supports the decorative film which is thin. This configuration facilitates bending of the decorative film alongside of the base on the end of the extended part toward the interior of the automobile from the exterior, to cover the end surface of the extended part.

In addition, the insert panel is embedded between the base which is bent and the end surface of the extended part. This configuration simplifies support and fixing of the base alongside of the decorative film inside the cavity to cover the end surface using the die-molding material.

In addition, the method of manufacturing the glass run includes: forming the extended part, alongside of the base and the decorative film, by extrusion molding; making the cut (M1) on the extended part, the cut (M1) extending by the predetermined length (L) from the end surface of the extended part, the cut (M1) being parallel to the decorative film (F); making the cut (M2) on the extended part, the cut (M2) extending by the predetermined length (J) toward the exterior of the automobile from the interior; removing the cut-off part (K) as the part of the extended part along the cut (M1) and the cut (M2); and bending the remainder part (Z) of the extended part on the appropriate part of the remainder part (Z) toward the interior of the automobile. This configuration improves unification and close adherence between the extended part and the base alongside of the decorative film F, as compared with the decorative film and the base which are separately attached to the end of the extended part formed by extrusion molding.

In addition, the method includes: bending the remainder part (Z) of the extended part by the bending distance (S), which is (L) minus (T) (S=L−T) where (L) is a predetermined length and (T) is a distance of straight part, toward the interior of the automobile; and subjecting the end surface (Za) of the remainder part (Z) to die molding to cover the end surface (Za). The die-molding material would cover unevenness on the edges of a space if edges of the cut-off part (K) are uneven, and leads to beautiful finishing of the products.

In addition, the decorative film has the upper end and the lower end bent to incline toward the interior of the automobile from the exterior or form arcs. The method includes: removing the cut-off part as part of the extended part; making cuts on the part of the upper end and the part of the lower end of the decorative film by the predetermined distance (FL1, FL2) (width in the front and rear direction of the cut-off parts of the decorative film) from the end surface of the extended part; removing the cut-off parts of the decorative film to reduce the width in the upper and lower direction of the remainder part of the decorative film; bending the remainder part of the decorative film, subjected to removal of the cut-off parts of the decorative film, by the bending distance (S) toward the interior of the automobile; and subjecting the end surface of the remainder part of the decorative film to die molding to cover the end surface.

This configuration prevents sharp-pointed parts or wrinkles on the bent part of the decorative film when the remainder part is bent toward the interior of the automobile from the exterior.

In addition, the first ends of the cut-off parts of the upper end and the lower end of the decorative film are chamfered and formed into curved corner parts. The first ends are opposite the second ends of the cut-off parts which are closer to the end surface of the extended part. This configuration further prevent the sharp-pointed parts or wrinkles.

DETAILED DESCRIPTION

Figure 1:
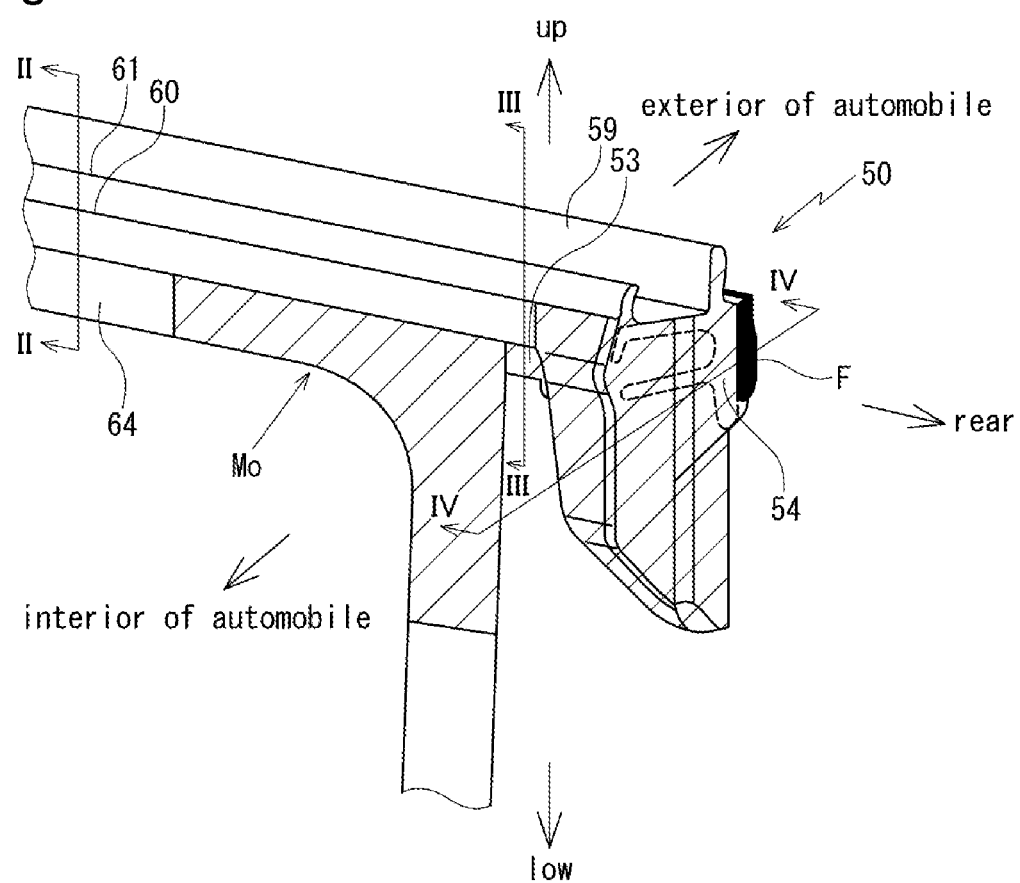
FIG. 1 is a perspective view of the principal components of a glass run according to an embodiment of the present invention.

Referring to FIG. 1 to FIG. 6D, and FIG. 10, a glass run according to an embodiment of the present invention will be described. When constituents or items correspond to those in prior arts, the same symbols are used. A shaded part in FIG. 1 indicates a die-molded part. A decorative film F in FIG. 1 to FIG. 6D is painted in black.

A glass run 50 according to the embodiment of the present invention is of so-called "hidden type". More specifically, as illustrated in FIGS. 1 to 3 and FIG. 10, the glass run 50 couples to a flange 3A of a frame 3 of a door of an automobile, a front door 1 in the present embodiment, to cover up a part of the frame 3 from an exterior of the automobile. The flange 3A extends toward the exterior of the automobile.

The glass run 50 includes a first extrusion-molded part closer to a roof of an automobile body and a second extrusion-molded part closer to a center pillar (illustration omitted) of the automobile body, and a die-molded part Mo. The die-molded part Mo connects the first extrusion-molded part with the second extrusion-molded part on a corner part closer to a rear end of an upper side of the front door 1. The glass run 50 guides a door glass G in the frame 3 and includes an installation member 51 and a body 52. The installation member 51 couples to the flange 3A. The body 52 forms a channel to receive the door glass G.

An outer-cabin side of the installation member 51 is extended toward a rear part of the automobile body with the front door 1 in a closed position, that is in a direction away from the front door 1, from the rear end of the upper side of the front door 1, to form an extended part 53. A decorative film F (bright film in the present embodiment) is attached to an outer-cabin side of the extended part 53 with a base 90 sandwiched between the decorative film F and the extended part 53. A garnish 81 is attached to a center pillar on an outer-cabin side of the front door 1, and a garnish 82 is attached to a center pillar on an outer-cabin side of the rear door 2.

Figure 2:
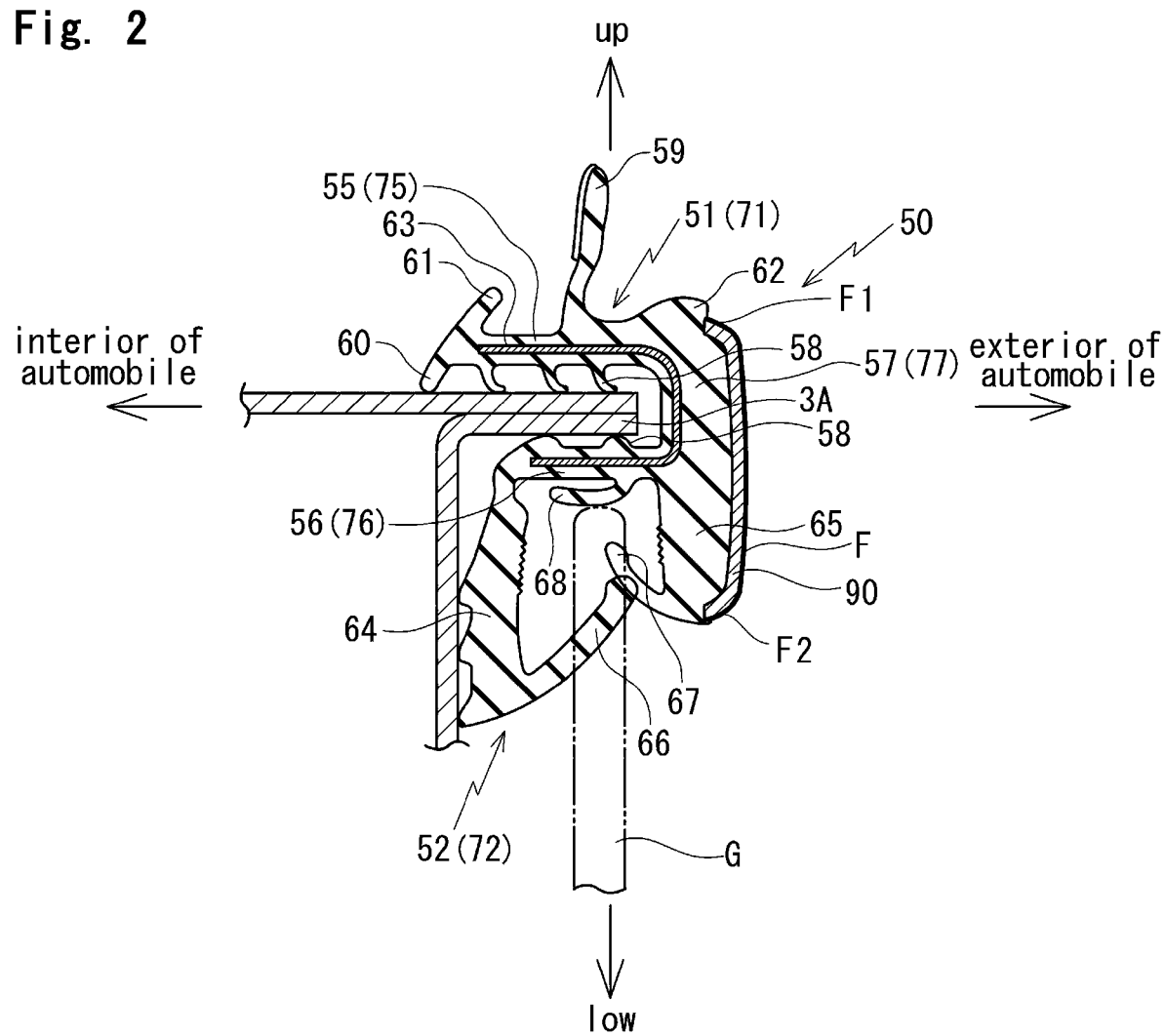
FIG. 2 is an enlarged vertical cross-sectional view of the glass run according to the embodiment of the present invention taken along line II-II of FIG. 1.

As illustrated in FIG. 2, the installation member 51 has a substantially U-shaped cross-section, and includes an upper side wall 55, a lower side wall 56, and a connecting wall 57. The upper side wall 55 and the lower side wall 56 extend in an inner-cabin and outer-cabin direction. The connecting wall 57 connects the upper side wall 55 and the lower side wall 56. The installation member 51 has an anchoring member 58 formed on an inner side to make elastic contact with the flange 3A. In the present embodiment, the upper side wall 55 has three lip-shaped anchoring members 58 on a lower surface, and the lower side wall 56 has two protrusion-shaped anchoring members 58 on an upper surface.

The upper side wall 55 includes a body seal lip 59, a seal lip 60, a lip 61, and a covering lip 62. The body seal lip 59 extends from a substantial center on an upper surface of the upper side wall 55 and makes elastic contact with a circumferential edge (illustration omitted) of a door opening of the automobile body to seal a gap between the automobile body and the front door 1. The seal lip 60 and the lip 61 extends from an inner-cabin side end of the upper side wall 55. The seal lip 60 extends downward toward an interior of the automobile and makes elastic contact with the flange 3A, and the lip 61 extends upward toward the exterior of the automobile. The covering lip 62 extends from part of the upper surface of the upper side wall 55 closest to the exterior of the automobile and makes contact with and covers an upper surface of the decorative film F, attached to the outer-cabin side of the glass run 50. A core 63, which has a substantially U-shaped cross-section, is embedded in the installation member 51 along the upper side wall 55, the connecting wall 57, and the lower side wall 56, to increase rigidity.

The body 52 includes the lower side wall 56, an inner-cabin side wall 64, and an outer-cabin side wall 65. The inner-cabin side wall 64 extends downward from an inner-cabin side of the lower side wall 56. The outer-cabin side wall 65 extends downward from an outer-cabin side of the lower side wall 56. The lower side wall 56 connects the side walls 64, 65 and forms the channel to receive the door glass G. The outer-cabin side wall 65 is continuous with the connecting wall 57. The outer-cabin side wall 65 and the connecting wall 57, which are integral with each other, are extended toward the rear part of the automobile body with the front door 1 in the closed position to form the extended part 53 (illustrated in FIG. 10).

The body 52 includes an inner lip 66 and an outer lip 67. The inner lip 66 extends toward the exterior of the automobile from an outer-cabin side surface of an end of the inner-cabin side wall 64, and is slidably brought into contact with an inner-cabin side surface of the door glass G. The outer lip 67 extends toward the interior of the automobile from an inner-cabin side surface of an end of the outer-cabin side wall 65 and is slidably brought into contact with an outer-cabin side surface of the door glass G. In the present embodiment, the body 52 also includes a glass seal lip 68. The glass seal lip 68 extends from a lower surface of the lower side wall 56 and makes elastic contact with an end of the door glass G. Alternatively, the glass seal lip 68 may be omitted.

Figure 3:
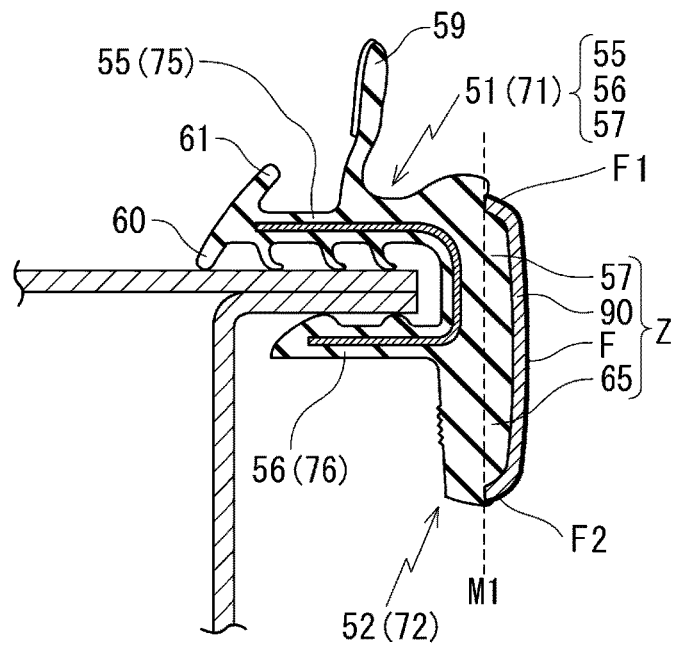
FIG. 3 is an enlarged vertical cross-sectional view of an extrusion-molded part as the principal components of the glass run according to the embodiment of the present invention taken along line III-III of FIG. 1.

FIG. 3 illustrates the installation member 51 and the body 52 on the extended part 53, formed by extrusion molding, in vertical cross section. The installation member 51 and the body 52 on the extended part 53 are prepared by cutting out and removing the inner-cabin side wall 64, the inner lip 66, the outer lip 67, and the glass seal lip 68 from an extruded shape in vertical cross section of the first extrusion-molded part illustrated in FIG. 2.

Part of a cover member 54 to be discussed later is connected with the installation member 51 or the body 52 by die molding (details of configuration omitted), and may be unified.

In the same manner as the glass run 50, which couples to the front door 1, a glass run 70 couples to the rear door 2. The glass run 70 has the same configuration (details omitted) as the glass run 50. The extended part 53 is extended toward the rear part of the automobile body, that is in the direction away from the rear end of the upper side of the front door 1. An extended part 73 of the glass run 70 on the rear door 2 is extended toward a front part of the automobile body, that is in the direction away from a front end of an upper side of the rear door 2. The glass run 50 couples to the frame 3 and the glass run 70 couples to a frame 4 of the rear door 2 with the extended part 53 and the extended part 73 faced each other on a parting portion between the front door 1 and the rear door 2.

Examples of the material of the glass runs 50, 70 include EPDM rubber and thermoplastic elastomer (TPE) such TPO, TPS. Also, the material may be foamed or solid. In this embodiment, the glass runs 50, 70 include solid material composed of TPE.

The base 90 is composed of hard resin higher in rigidity than the extended parts 53, 73, and has a thickness of not more than 2 mm (preferably not more than 1 mm). Also, the base 90 has a flexural modulus of elasticity that falls within a range of 850 to 4500 MPa, which is higher than the glass runs 50, 70.

Examples of the material of the base 90 include polypropylene with talc or glass fiber mixed. Changing the amount of talc or glass fiber to be mixed secures the flexural modulus of elasticity of the base 90 within the above-mentioned range. In this embodiment, it is only required that the base 90 has the flexural modulus of elasticity that falls within the above-mentioned range. In some embodiments, the base 90 is composed of material other than polypropylene with talc or glass.

Figure 20:
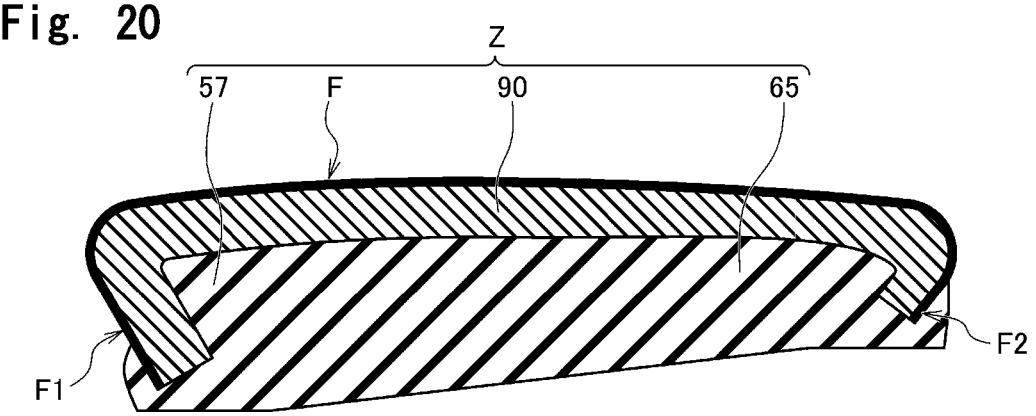
FIG. 20 is an enlarged cross-sectional view of the principal components of an extrusion-molded part of the glass run according to another embodiment of the present invention, that is different from the embodiment illustrated in FIG. 3.

As illustrated in FIGS. 2 and 3, the decorative film F has an upper end F1 and a lower end F2 bent to incline toward the interior of the automobile from the exterior or form arcs (alternatively, the decorative film F may be straight-linear in an upper and lower direction without bending the upper end F1 and the lower end F2). In some embodiments, as illustrated in FIG. 20, the upper end F1 and the lower end F2 are bent to form the arcs and partially covered with extrusion-molding material, in a different manner from FIG. 3.

Figure 4:
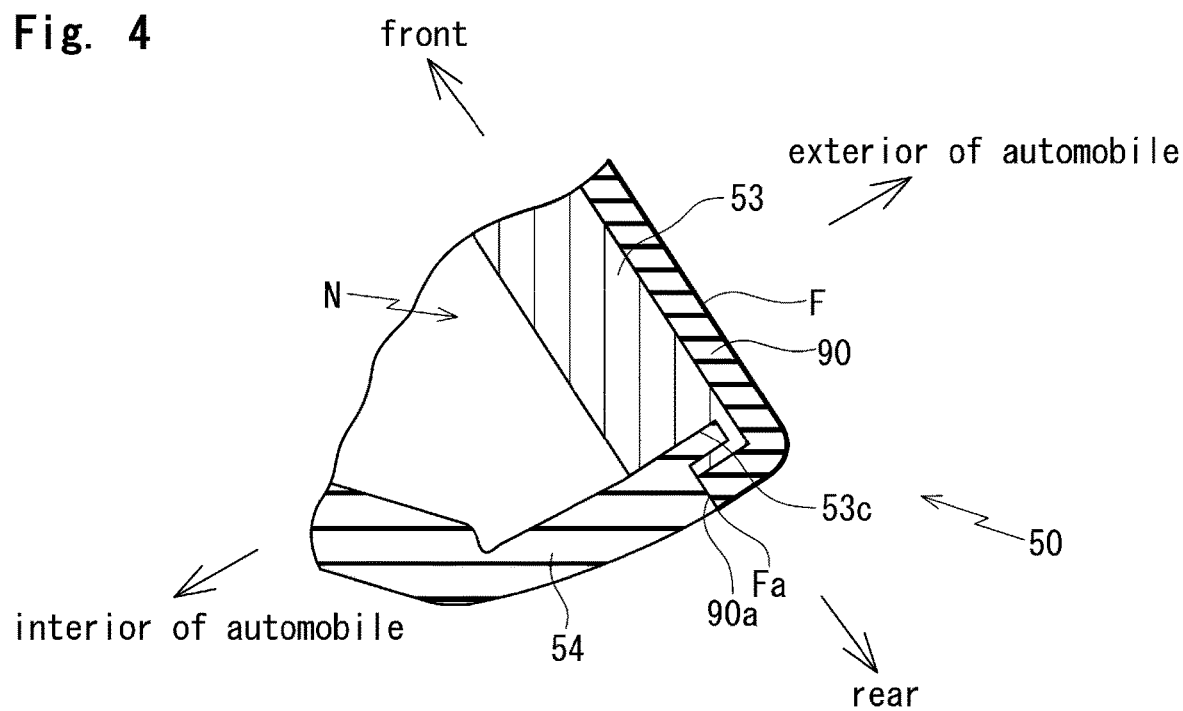
FIG. 4 is an enlarged cross-sectional view of the principal components of the glass run according to the embodiment of the present invention taken along line IV-IV of FIG. 1.
Figure 5:
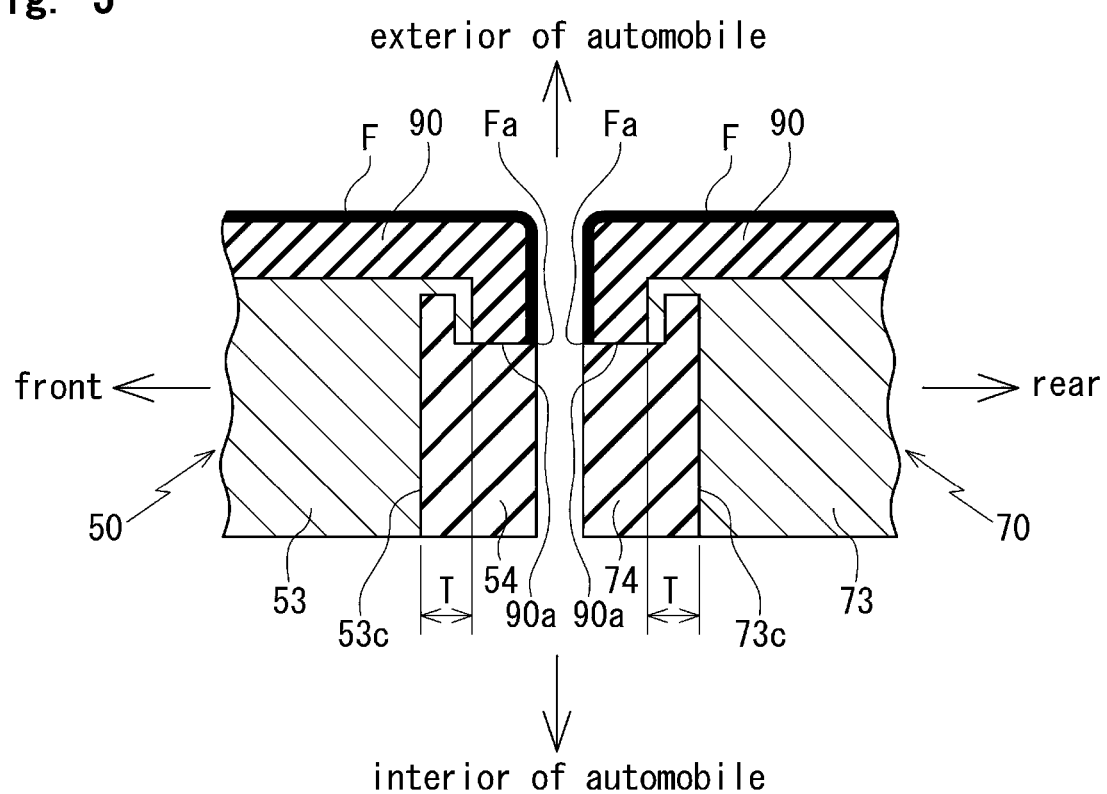
FIG. 5 is an enlarged cross-sectional view of the principal components of a coupling structure according to an embodiment of the present invention of the glass run.

As illustrated in FIGS. 4 and 5, the decorative film F alongside of the base 90 is bent on the end of the extended part 53, to make a right-angled turn toward the interior of the automobile from the exterior, and cover an end surface 53c of the extended part 53. The end surface 53c appears when part of the extended part 53 is removed. In the same manner, the decorative film F alongside of the base 90 is bent on the end of the extended part 73, to make the right-angled turn toward the interior of the automobile, and cover an end surface 73c of the extended part 73. The end surface 73c appears when part of the extended part 73 is removed.

The cover member 54 fills up a space between the end surface 53c and the base 90 alongside of the decorative film F, which are bent. The cover member 74 fills up a space between the end surface 73c and the base 90 alongside of the decorative film F, which are bent. The cover members 54, 74 are composed of die-molding material. FIG. 4 also illustrates a core N for use on a cavity for die molding for better understanding about how the components are arranged.

Examples of the decorative film F include thin films and film materials composed of elaborately designed layers with adhesive or a bonding layer on rear surfaces.

More specifically, the examples include thin films of stainless steel, metallised films, synthetic resin multilayer films, films decorated with patterns, and films painted in desired colors.

In the present embodiment, it is only required that the adhesive or the bonding layer adheres to or bonds to the base 90. In some embodiments, the adhesive or the bonding layer is accompanied by a primer to be sandwiched between the base 90 and the adhesive or the bonding layer.

Referring to FIGS. 6A to 6D, a method according to an embodiment of the present invention of manufacturing the extended parts 53, 73 will be described. The extended part 53 extends from the corner part closer to the rear end of the upper side of the front door 1 on which the die molded part Mo connects the first extrusion-molded part with the second-extrusion molded part to form the glass run 50. The extended part 73 extends from the corner part closer to the front end of the upper side of the rear door 2 on which the die molded part Mo connects the first extrusion-molded part with the second-extrusion molded part to form the glass run 70.

Figure 6A:
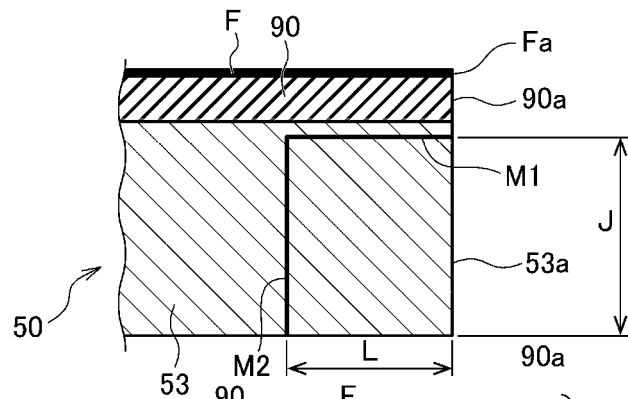
FIGS. 6A to 6D are enlarged cross-sectional views of the principal components of a manufacturing process according to an embodiment of the present invention of the glass run.

The base 90 and the decorative film F, alongside of the installation member 51 and the body 52, are formed by extrusion molding (FIG. 6A). In the same manner, the base 90 and the decorative film F, alongside of the installation member 71 and the body 72, are formed by extrusion molding.

Figure 6B:
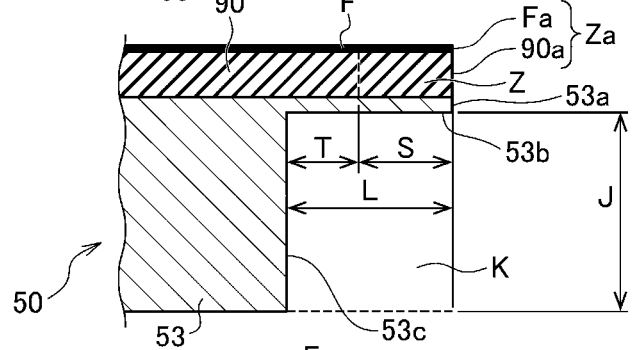

Part of the extended part 53, except for the base 90 and the decorative film F, is cut by predetermined length (L) from the end using cutting tools such as cutters and rotary blades, such that at least the base 90 and the decorative film F remain untouched (FIG. 6B). In the same manner, part of the extended part 73, except for the base 90 and the decorative film F, is cut by the predetermined length (L) from the end using cutting tools such as cutters and rotary blades, such that at least the base 90 and the decorative film F remain untouched.

More specifically, as illustrated in FIG. 6A, a first cut M1 and a second cut M2 are made on the extended part 53. The cut M1 extends by the predetermined length (L) from the end surface 53a of the extended part 53, and is parallel to the decorative film F. The cut M2 extends by a predetermined length (J) toward the exterior of the automobile from the interior. In the same manner, the cut M1 and the cut M2 are made on the extended part 73. The cut M1 extends by the predetermined length (L) from the end surface 73a of the extended part 73, and is parallel to the decorative film F. The cut M2 extends by the predetermined length (J) toward the exterior of the automobile from the interior.

As illustrated in FIG. 6B, the cuts M1, M2 allow for easy removal of cut-off part K. The cut-off part K forms part of the extended part 53. In the same manner, the cut-off part K forms part of the extended part 73.

When the cut-off part K is removed from the extended part 53, the cut M1 forms a side surface 53b and the cut M2 forms the end surface 53c. In the same manner, when the cut-off part K is removed from the extended part 73, the cut M1 forms a side surface 73b and the cut M2 forms the end surface 73c. The cuts M1 are preferably made prior to the cuts M2, but the order is not limited. Either of the cuts M1, M2 may be formed first, or the cuts M1, M2 may be formed simultaneously. In making the cuts M1, only the bases 90 and the decorative films F may remain untouched. If the base 90 is thin as illustrated in FIG. 3 or a boundary line is curved, not linear, between the base 90 and the connecting wall 57 or the outer-cabin side wall 65, part of the connecting wall 57 or the outer-cabin side wall 65 on the extended part 53 may remain on the base 90 in making the cuts M1.

The base 90 stably supports the decorative film F, which is thin, on the end surface 53a. In the same manner, the base 90 stably supports the decorative film F, which is thin, on the end surface 73a. This configuration facilitates the removal of only the cut-off parts K from the extended part 53 and the extended part 73.

Figure 6C:
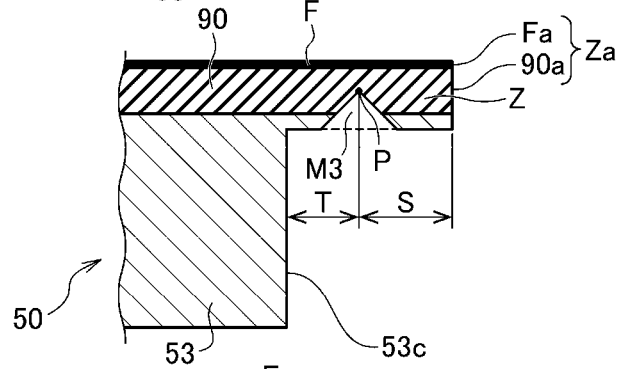
Figure 6D:
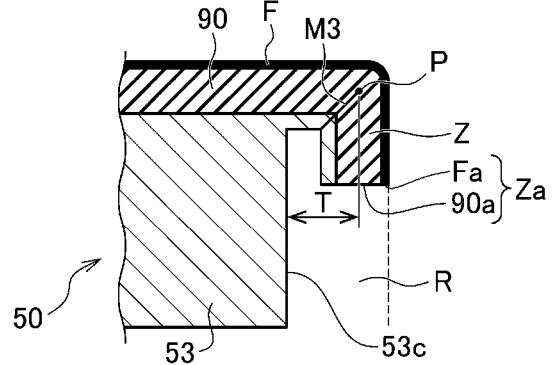

When the cut-off part K is removed from the extended part 53, a remainder part Z remains. The remainder part Z includes the decorative film F and the base 90. In the same manner, when the cut-off part K is removed from the extended part 73, the remainder part Z remains. The remainder part Z includes the decorative film F and the base 90. The remainder parts Z are bent by a bending distance (S) toward the interior of the automobile (FIGS. 6B, 6C, 6D). The bending distance (S) is (L) minus (T) (S=L−T), where (L) is a predetermined length and (T) is a distance of straight part.

The bases 90 stably support the decorative films F, which are thin. This configuration facilitates bending of the decorative films F alongside of the bases 90 toward the interior of the automobile from the exterior.

The decorative films F alongside of the bases 90 are bent around points P toward the interior of the automobile. The points P are within the bending distance (S) from end surfaces 90a of the bases 90 (FIG. 6C).

In the present embodiment, a cut M3 is made to extend upward toward an outer side to the point P from the side surface 53b, which appears when the cut-off part K is removed (FIG. 6C), and form a concave part having a triangular shape such that the cut M3 is closed when the base 90 is in the bent position (FIG. 6D). In the same manner, the cut M3 is made to extend upward toward the outer side to the point P from side surface 73b, which appears when the cut-off part K is removed, and form the concave part having the triangular shape such that the cut M3 is closed when the base 90 is in the bent position. In some embodiments, the cuts M3 are linear or omitted. Alternatively, the remainder parts Z, which remain when the cut-off parts K are removed and include the decorative films F and the bases 90, may be bent on appropriate parts toward the interior of the automobile.

Figure 19A:
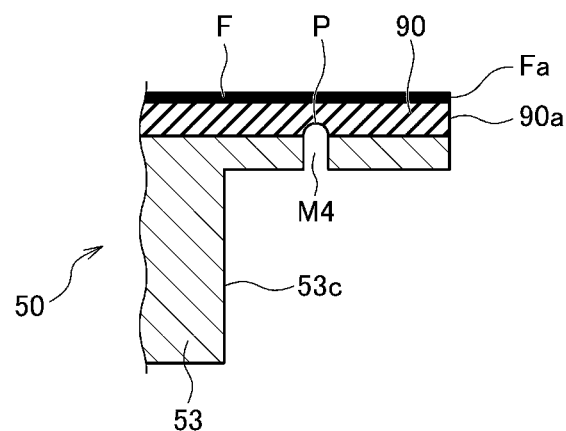
FIGS. 19A to 19C are enlarged cross-sectional views of the principal components of the manufacturing process according to still another embodiment of the present invention of the glass run.
Figure 19B:
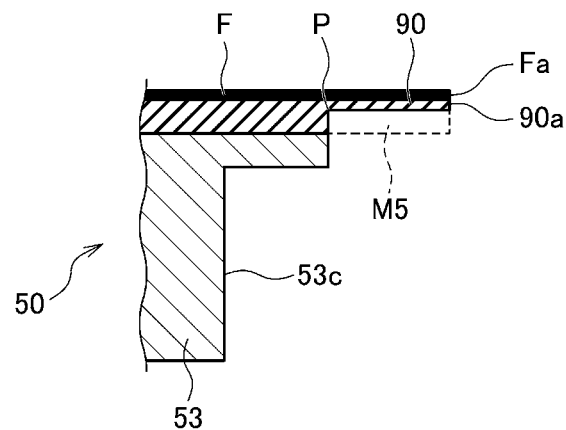
Figure 19C:
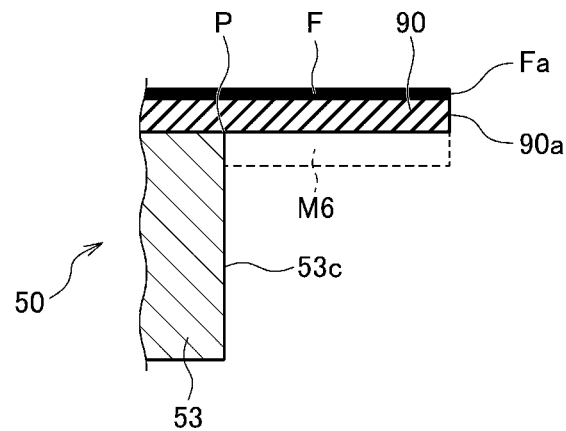

In some embodiments, as illustrated in FIG. 19A, the cuts M3 are cuts (concave parts) M4, having quadrilateral shapes which are made, for example, by cutlery or hot plates. Alternatively, as illustrated in FIG. 19B, the cuts M3 may be cuts (concave parts) M5 having quadrilateral shapes which are made, for example, by the cutlery or hot plates, to remove parts of the bases 90 as well. Alternatively, as illustrated in FIG. 19C, the cuts M3 may be cuts (concave parts) M6 having quadrilateral shapes which are made, for example, by the cutlery, to leave the bases 90 untouched and without the distance T of the straight part (distance T is zero).

Next, as illustrated in FIGS. 5 to 6D, the cover member 54, composed of the die-molding material, is formed by die molding on a space (R). The space (R) covers an end (Za) of the remainder part Z, which includes the bending shape of the decorative film F and the base 90, and the end surface 53c, which appears when part of the extended part 53 is removed. In the same manner, the cover member 74, composed of the die-molding material, is formed by die molding on the space (R). The space (R) covers the end (Za) of the remainder part Z, which includes the bending shape of the decorative film F and the base 90, and the end surface 73c, which appears when part of the extended part 73 is removed.

The die-molding material would cover unevenness on the edges of the spaces (R) if the edges of the cut-off parts K are uneven, and leads to beautiful finishing of the products.

In the present embodiment, the cover member 54 is aligned with the surface of the decorative film F, which is bent, and the cover member 54, colored black, is not visible when the door 1 is seen from the exterior of the automobile. In the same manner, the cover member 74 is aligned with the surface of the decorative film F, which is bent, and the cover member 74, colored black, is not visible when the door 2 is seen from the exterior of the automobile.

The decorative film F on the outer-cabin side of the extended part 53 of the glass run 50 according to the embodiment is bent on the end of the extended part 53 toward the interior of the automobile, to cover the end surface 53c. In the same manner, the decorative film F on the outer-cabin side of the extended part 73 of the glass run 70 according to the embodiment is bent on the end of the extended part 73 toward the interior of the automobile, to cover the end surface 73c. This configuration allows for exposure of the decorative films F on the surfaces of the extended parts 53, 73.

This configuration improves a continuous appearance between the decorative film F on the front door 1 and the decorative film F on the rear door 2 on the parting portion between the front door 1 and the rear door 2, to allow for better appearance.

The use of the decorative films F leads to lower manufacturing cost and weight saving as compared with the use of metal moldings on the products having the same appearance.

Figure 7:
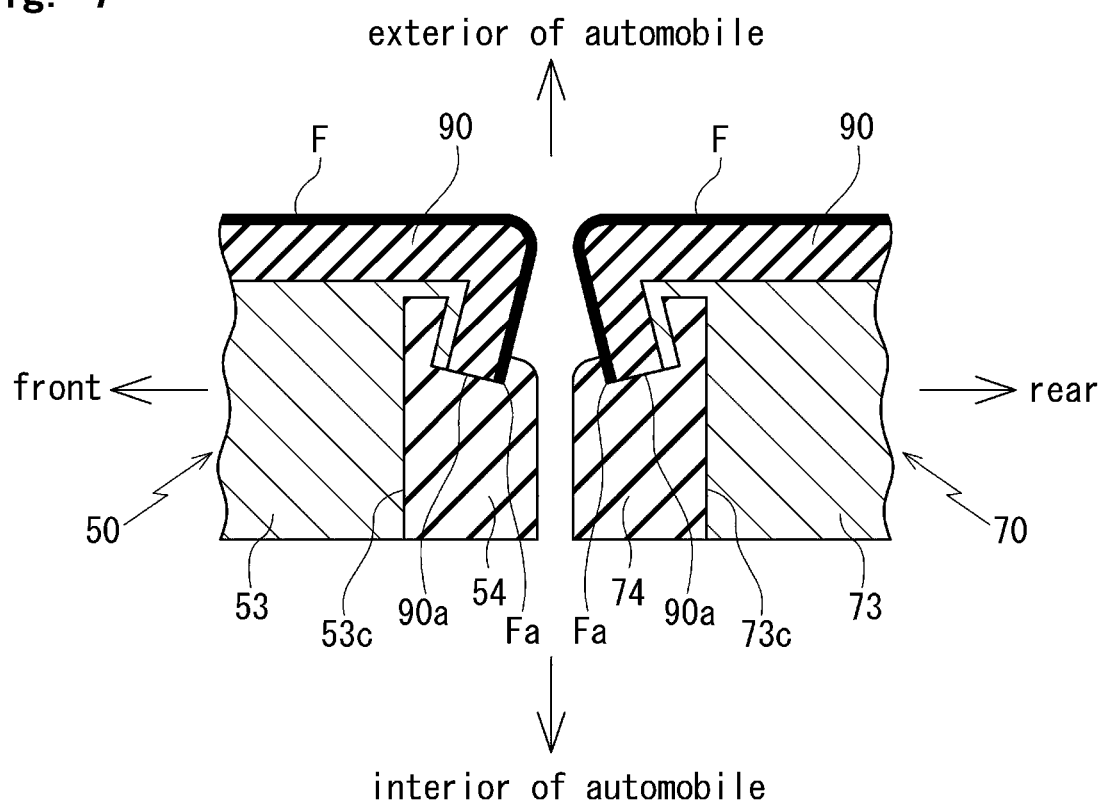
FIG. 7 is an enlarged cross-sectional view of the principal components of the coupling structure according to another embodiment of the present invention of the glass run.

In the present embodiment, as illustrated in FIGS. 5 to 6D, at least the decorative films F and the bases 90 are bent to make the right-angled turns toward the interior of the automobile. The angle of the turns is not limited. In some embodiments, as illustrated in FIG. 7, the decorative film F and the base 90 are bent and folded to make acute-angled turns, not right-angled turns, toward the front part on the front door 1. In the same manner, the decorative film F and the base 90 are bent and folded to make acute-angled turns, not right-angled turns, toward the rear part on the rear door 2. In this modification also, the cover member 54 is formed by die molding on the space (R), which covers the bent remainder part and the end surface 53c, and the cover member 74 is formed by die molding on the space (R), which covers the bent remainder part and the end surface 73c. The end surface 53c is part of the extended part 53 (remainder of the extended part 53 after removal of cut-off part K) and appears when the cut-off part K is removed. The end surface 73c is part of the extended part 73 (remainder of the extended part 73 after removal of cut-off part K) and appears when the cut-off part K is removed.

In this modification, the cover member 54 is not aligned with the surface of the decorative film F, and the die-molding material clasps the decorative film F and the base 90, which are bent. In the same manner, the cover member 74 is not aligned with the surface of the decorative film F, and the die-molding material clasps the decorative film F and the base 90, which are bent. This configuration increases close adherence between the die-molding material and the base 90 alongside of the decorative film F, and improves bond strength.

Figure 8:
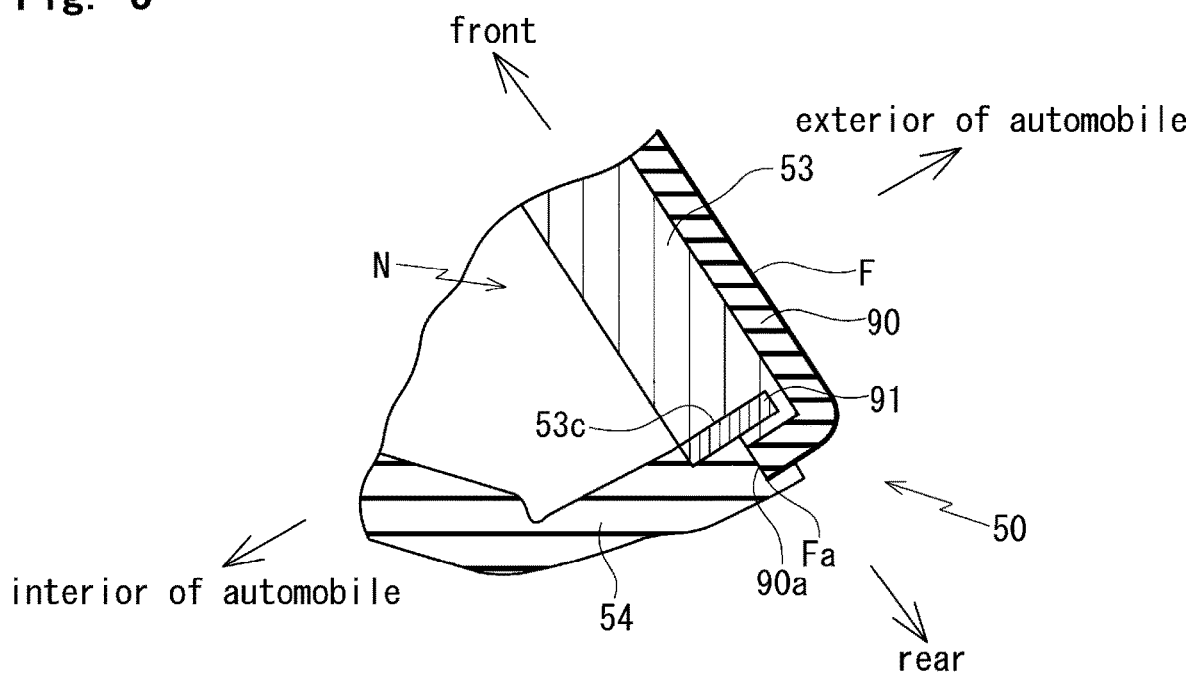
FIG. 8 is an enlarged cross-sectional view of the principal components of the glass run according to another embodiment of the present invention taken along line IV-IV of FIG. 1.

In the present embodiment, the die-molding material is poured into the spaces (R). The space (R) covers the decorative film F and the base 90, which are bent, and the end surface 53c. In the same manner, the space (R) covers the decorative film F and the base 90, which are bent, and the end surface 73c. The configuration of the space (R) is not limited. In some embodiments, as illustrated in FIG. 8, an insert panel 91 is inserted between the end surface 53c and the base 90 alongside of the decorative film F, which are bent. The insert panel 91 has a rectangular-shaped cross section. In the same manner, the insert panel 91 is inserted between the end surface 73c and the base 90 alongside of the decorative film F, which are bent. In this modification, the space (R) covers the insert panel 91 as well as the end (Za) of the remainder part Z and the end surface 53c, and is subjected to die molding. In the same manner, the space (R) covers the insert panel 91 as well as the end (Za) of the remainder part Z and the end surface 73c, and is subjected to die molding.

In some embodiments, the insert panel 91 is bonded to the base 90 of the remainder part (Z) or the end surface 53c for unification, if necessary, prior to the die molding by cavity. In the same manner, the insert panel 91 is bonded to the base 90 of the remainder part (Z) or the end surface 73c.

In this modification, the cover member 54 may cover the outer side of the decorative film F on the base 90, which are bent, to hold the decorative film F and the base 90 with the insert panel 91. In the same manner, the cover member 74 may cover the outer side of the decorative film F on the base 90, which are bent, to hold the decorative film F and the base 90 with the insert panel 91.

In this modification, the insert panels 91 are inserted in the spaces (R) first, and the spaces (R) are subjected to die molding next. The spaces (R) cover the insert panels 91 as well as lower ends of the decorative films F and the bases 90, which are bent. This configuration simplifies support and fixing of the bases 90 alongside of the decorative films F inside the cavity (illustration omitted) for the die molding, and improves precision in the shape of the die-molded parts. In some embodiments, an area of the insert panel 91 is smaller than an area by which the decorative film F and the base 90 are bent (illustration omitted). This configuration increases adhesive areas between the base 90 and the cover member 54 and between the base 90 and the cover member 74, to further improve bond strength.

Figure 9:
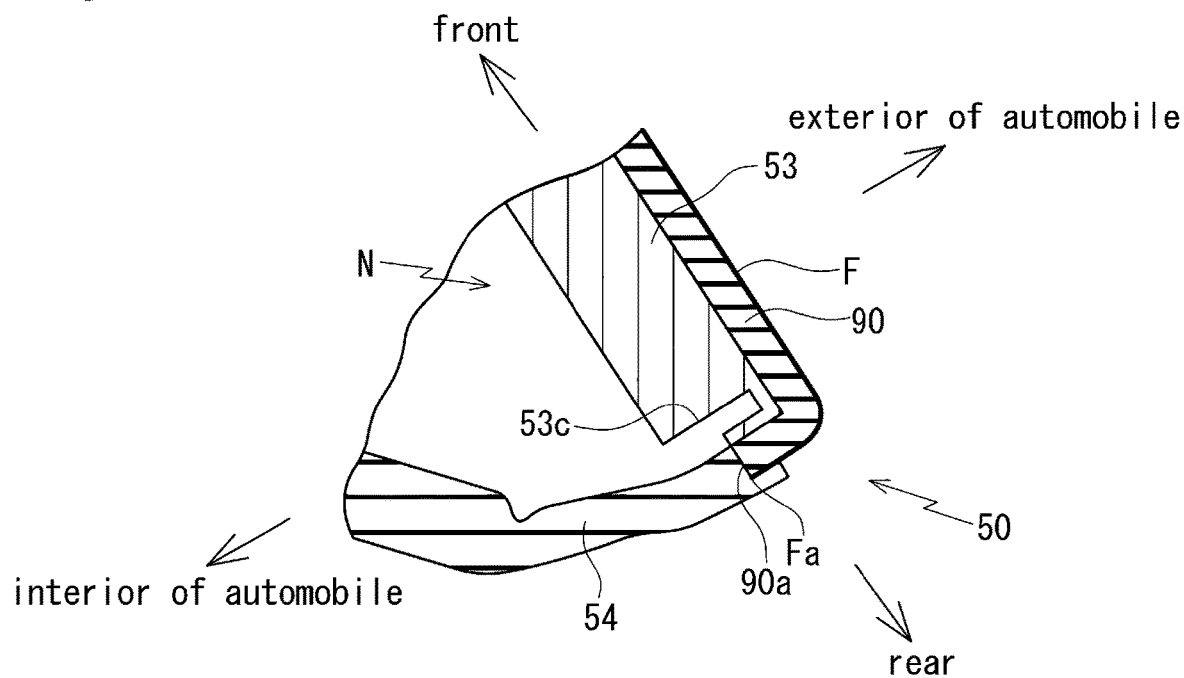
FIG. 9 is an enlarged cross-sectional view of the principal components of the glass run according to still another embodiment of the present invention taken along line IV-IV of FIG. 1.

In some embodiments, as illustrated in FIG. 9, the core N for use on the cavity, not the insert panel 91 illustrated in FIG. 8, directly supports the die-molding material to form the cover members 54, 74 by die molding.

In the present embodiment, as illustrated in FIG. 6B, the cut-off parts K as parts of the extended parts 53, 73 are removed along the cuts M1, M2 first, and then, the remainder parts (Z) are bent by the bending distance (S), which is (L) minus (T) (S=L−T) where (L) is a predetermined length and (T) is a distance of straight part, toward the interior of the automobile. The removal is not limited to the cut-off parts K. In some embodiments, as illustrated in FIG. 15, cut-off parts FK1 of the decorative films F are removed from the upper ends F1 and the lower ends F2 of the decorative films F after removal of the cut-off parts K, and then, remainder parts (FZ1) are bent toward the interior of the automobile.

Figure 14:
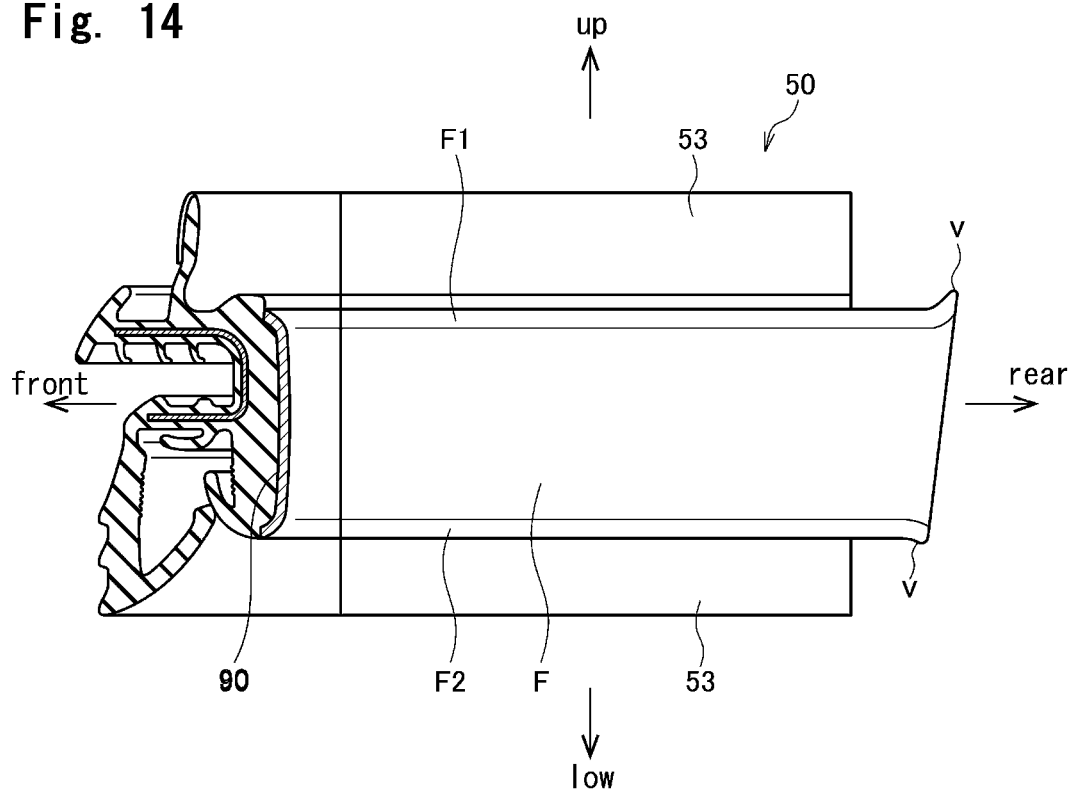
FIG. 14 is a side view of the manufacturing process according to the embodiment of the present invention of the glass run, with sharp-pointed parts appearing on an end.

This configuration prevents the sharp-pointed parts V illustrated in FIG. 14 or wrinkles on the upper ends F1 and the lower ends F2 of the decorative films F. The upper ends F1 and the lower ends F2, which are bent to incline toward the interior of the automobile or form arcs in vertical cross section, can cause the sharp-pointed parts V or wrinkles when the remainder parts (Z) of the extended parts 53, 73 are bent toward the interior of the automobile from the exterior and parts of the remainder parts (Z) on inner sides of the bent parts have nowhere to go due to perimeter difference.

Figure 15:
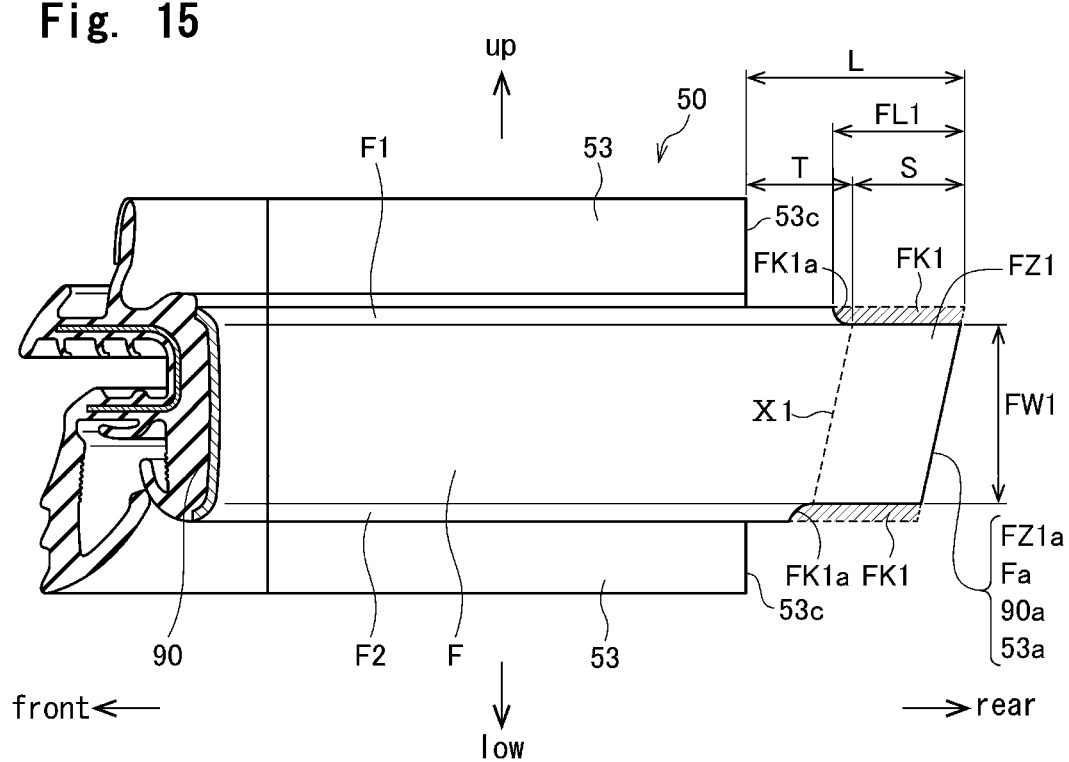
FIG. 15 is a side view of the manufacturing process according to another embodiment of the present invention of the glass run.

To prevent the sharp-pointed parts V or wrinkles, the cut-off part K as the part of the extended parts 53 is removed first as illustrated in FIG. 6B, and then, the parts of the upper end F1 and the lower end F2 of the decorative film F are removed by predetermined distance FL1 (width in a front and rear direction of the cut-off parts FK1 of the decorative film F) from the end surface 53a as illustrated in FIG. 15, to reduce width FW1 in an upper and lower direction of remainder part of the decorative film F. A shaded part in FIG. 15 indicates the cut-off parts FK1 of the decorative films F. In the same manner, the cut-off part K as the part of the extended part 73 is removed first as illustrated in FIG. 6B, and then, the parts of the upper end F1 and the lower end F2 of the decorative film F are removed by predetermined distance FL1 (width in the front and rear direction of the cut-off parts FK1 of the decorative films F) from the end surface 73a as illustrated in FIG. 15, to reduce the width FW1 in the upper and lower direction of the remainder part of the decorative film F.

Figure 16:
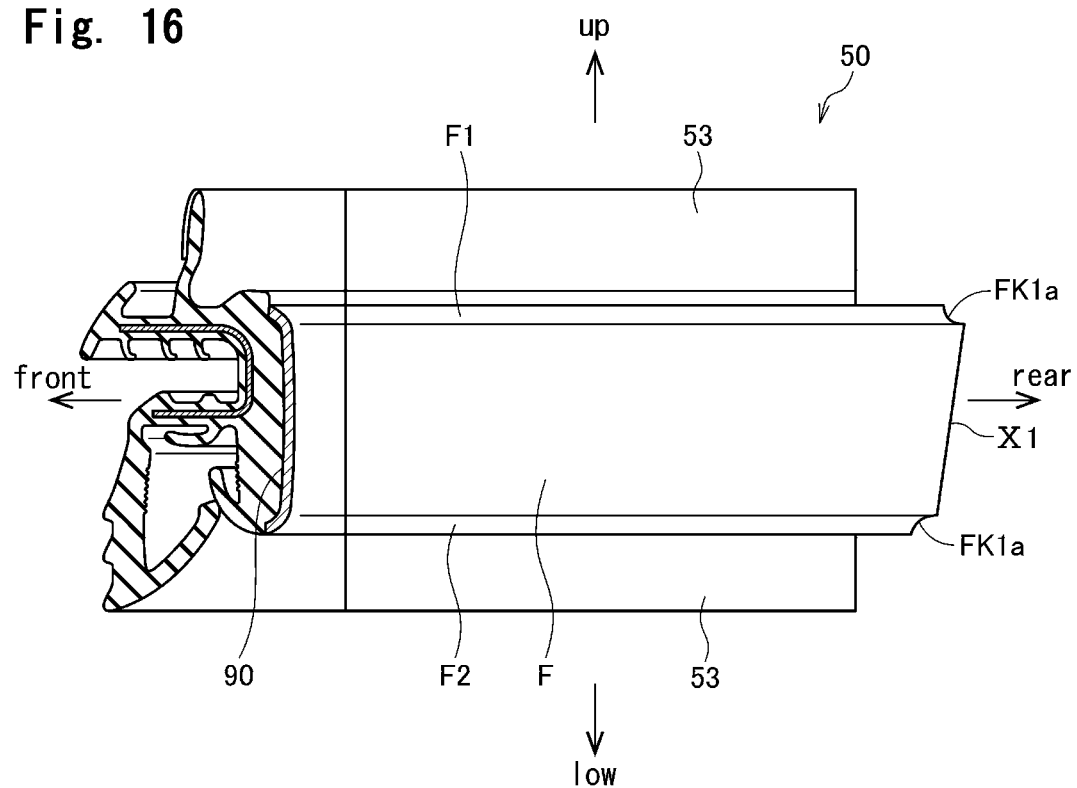
FIG. 16 is a side view of the manufacturing process according to another embodiment of the present invention of the glass run following the manufacturing process illustrated in FIG. 15.
Figure 17:
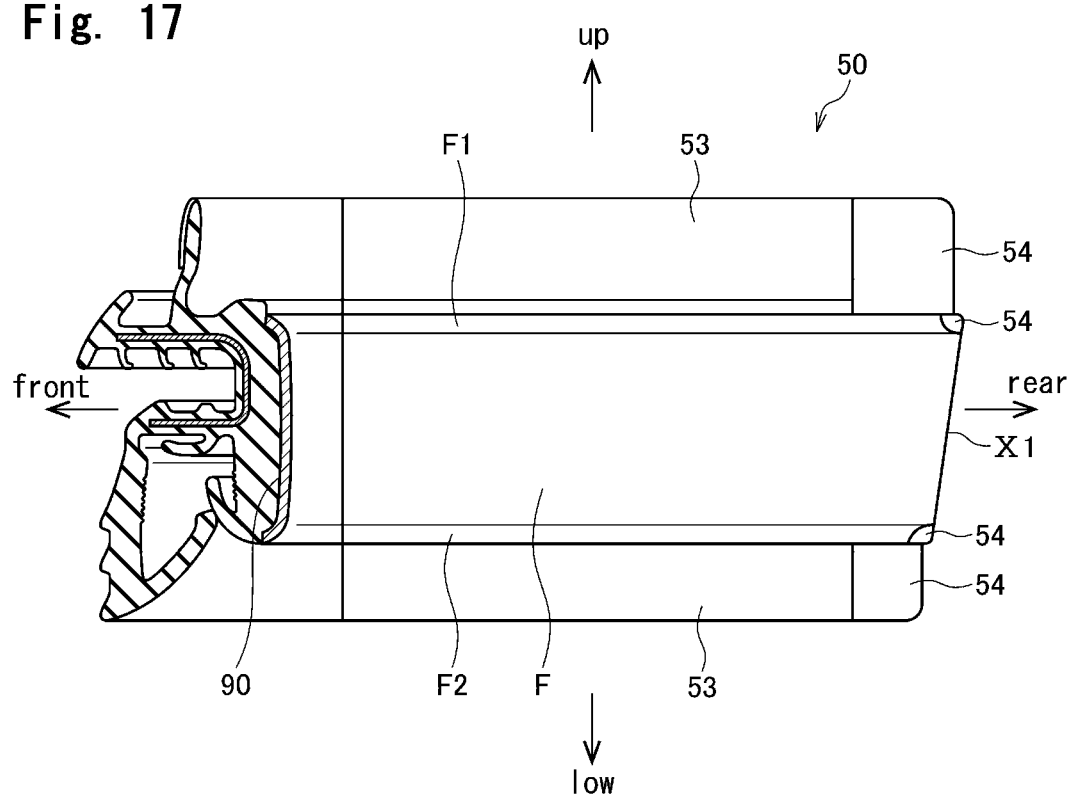
FIG. 17 is a side view of the manufacturing process according to another embodiment of the present invention of the glass run, following the process illustrated in FIG. 16.

FIG. 16 illustrates a manufacturing process in which the remainder part (FZ1) of the extended part 53 is bent toward the interior of the automobile along a crease X1 indicated by a dotted line in FIG. 15. In the same manner, the remainder part (FZ1) of the extended part 73 is bent toward the interior of the automobile along the crease X1. FIG. 17 illustrates a manufacturing process, following the process illustrated in FIG. 16, in which the cover member 54, composed of die-molding material, is formed by die molding. In the same manner, the cover member 74, composed of die-molding material, is formed by die molding.

The crease X1 inclines in a manner that a lower part approaches the front part of the automobile body. A direction in which the crease X1 inclines is not limited, and may be changed depending on the design of the automobile. In some embodiments, the crease X1 inclines in the same direction as FIG. 15 when the glass run couples to a rear upper end of the front door or a front upper end of the rear door.

In some embodiments, the crease X1 does not incline due to the design of the automobile.

In some embodiments, as illustrated in FIG. 6C, the cuts M3 are made on the bases 90 to extend upward toward the outer side to the points P and form the concave parts having triangular shapes. Alternatively, the cuts M3 may be linear or omitted.

In some embodiments, the cuts (concave parts) M4 illustrated in FIG. 19A, the cuts (concave parts) M5 illustrated in FIG. 19B, and the cuts (concave parts) M6 illustrated in FIG. 19C are made instead of the cuts M3 illustrated in FIG. 6C.

In removing the cut-off parts FK1, as illustrated in FIG. 15, first ends of the cut-off parts FK1 are chamfered (chamfers FK1a) and formed into curved corner parts, to further prevent the sharp-pointed parts V or wrinkles. The first ends are opposite second ends of the cut-off parts FK1 closer to the end surfaces 53a, 73a.

In some embodiments, the chamfers FK1a start around where the cut-off parts FK1 intersect the crease X1. Alternatively, the chamfers FK1a may start from where the cut-off parts FK1 intersect the crease X1.

In some embodiments, the extended parts 53, 73 may also be subjected to thermal compression molding to minimize the cut-off parts FK1. Thermal compression molding prevents the extended parts 53, 73 to be subjected to bending from returning to the original shapes.

Figure 18:
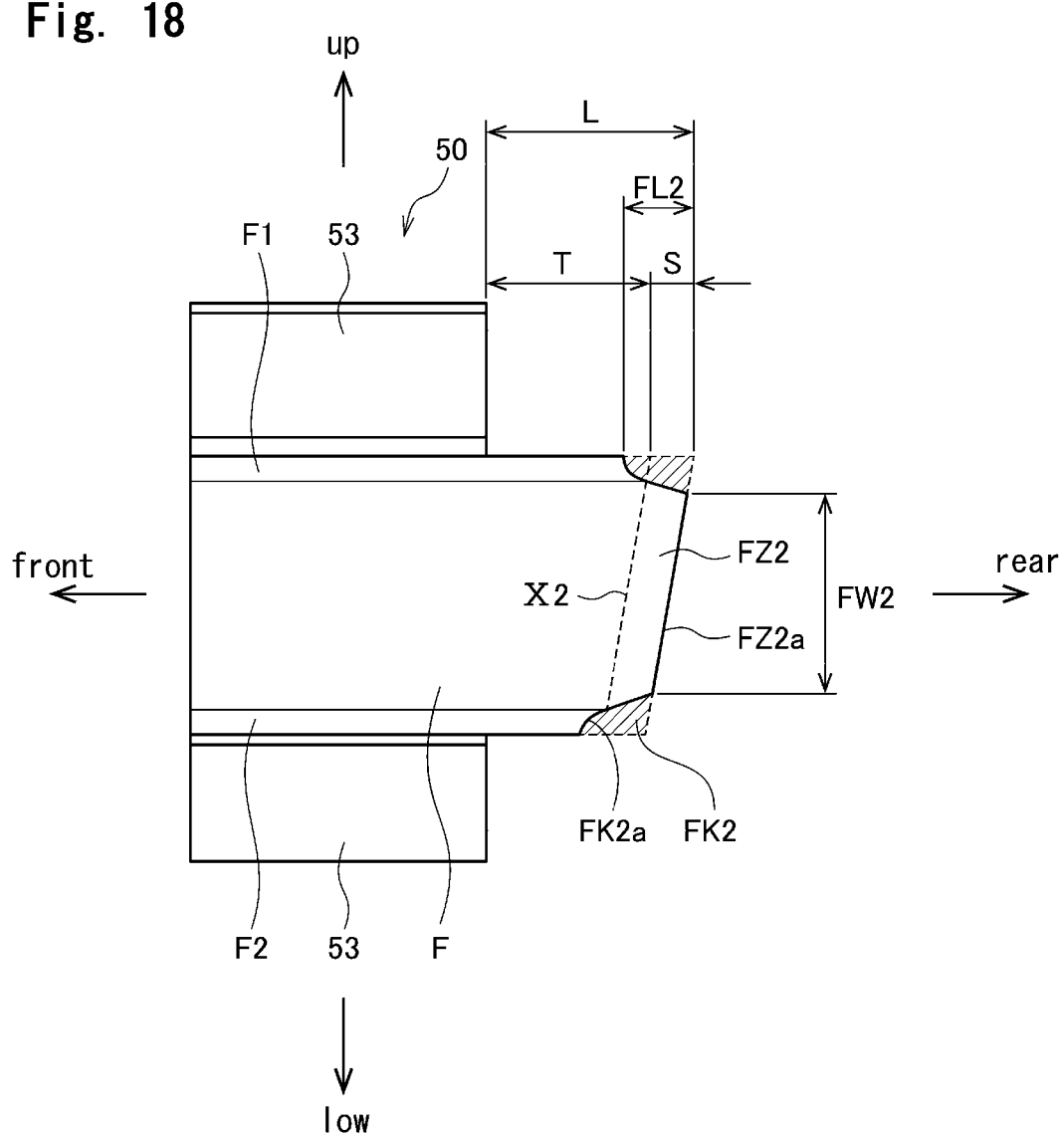
FIG. 18 is a side view of the manufacturing process according to still another embodiment of the present invention of the glass run, that is different from the embodiment illustrated in FIG. 15.

In some embodiments, the cut-off parts FK1 illustrated in FIG. 15 are cut-off parts FK2 of the decorative films F illustrated in FIG. 18.

As illustrated in FIG. 15, the crease X1 is preferably close to radius curvature ends of the chamfers FK1a. If the crease X1 is on a straight part (closer to an end surface FZ1a of the remainder part FZ1 than the radius curvature ends), the die-molded parts colored black as the cover members 54, 74 to fill up the chamfers FK1a are visible over a wider range from the exterior of the automobile. As illustrated in FIG. 18, a crease X2 is preferably close to radius curvature ends of chamfers FK2a. If the crease X2 is on a straight part (closer to an end surface FZ2a of the remainder part FZ2 than the radius curvature ends), the die-molded parts colored black as the cover members 54, 74 to fill up the chamfers FK2a are visible over a wider range from the exterior of the automobile. This degrades appearance of the automobile and is not favorable. If the crease X1 is not closer to the end surface FZ1a than the radius curvature ends (closer to the front part of the automobile body than the radius curvature ends), more parts of the remainder parts FZ1 on the inner sides of the bent parts overlap. If the crease X2 is not closer to end surface FZ2a than the radius curvature ends (closer to the front part of the automobile body than the radius curvature ends), more parts of the remainder parts FZ2 on the inner sides of the bent parts overlap. This enlarges the sharp-pointed parts V or wrinkles, degrades appearance of the glass runs, and is not favorable.

As compared with the cut-off parts FK1, upper ends and lower ends of cut-off parts FK2 of the decorative films F are inclined to approach the center of the decorative films F toward the end surfaces FZ2a. In addition, width FW2 in an upper and lower direction of remainder parts of the decorative films F is shorter than the width FW1, and predetermined distance FL2 (width in a front and rear direction of the cut-off parts FK2 of the decorative films F) is shorter than the predetermined distance FL1. In addition, first ends of the cut-off parts FK2 are chamfered (chamfers FK2a) and formed into curved corner parts, and the chamfers FK2a are smaller than the chamfers FK1a. The first ends are opposite second ends of the cut-off parts FK2 closer to the end surfaces 53a, 73a.

In some embodiments, the chamfers FK2a start around where the cut-off parts FK2 intersect the crease X2. Alternatively, the chamfers FK2a may start from where the cut-off parts FK2 intersect the crease X2.

As illustrated in FIGS. 16 and 17, the die-molded parts colored black as the cover members 54, 74 to fill up the chamfers FK1a are visible over a narrower range from the exterior of the automobile. This improves appearance of the automobile. In addition, the width FW2, which is shorter than the width FW1, decreases the parts of the remainder parts (Z) on inner sides of the bent parts to overlap, decreases the sharp-pointed parts V or wrinkles, and improves appearance of the glass runs.

In the present embodiment, the base 90 and the decorative film F, alongside of the installation member 51 and the body 52, are formed by extrusion molding first, and the part of the extended part 53 is removed next. In the same manner, the base 90 and the decorative film F, alongside of the installation member 71 and the body 72, are formed by extrusion molding first, and the part of the extended part 73 is removed next. The configuration of the glass runs 50, 70 is not limited. In some embodiments, the first extrusion molded parts do not include the base 90 on the outer-cabin side of the connecting walls 57, 77 or the outer-cabin side wall 65. The die molded part Mo connects the first extrusion molded part without the base 90 with the second extrusion molded part. The decorative film F is separately attached to the outer-cabin side of the glass run 50, and is bent on the end of the extended part 53 toward the interior of the automobile from the exterior to cover the end of the extended part 53 where the die-molding material covers the end surface 53a. In the same manner, the decorative film F is separately attached to the outer-cabin side of the glass run 70, and is bent on the end of the extended part 73 toward the interior of the automobile from the exterior to cover the end of the extended part 73 where the die-molding material covers the end surface 73a.

Figure 12:
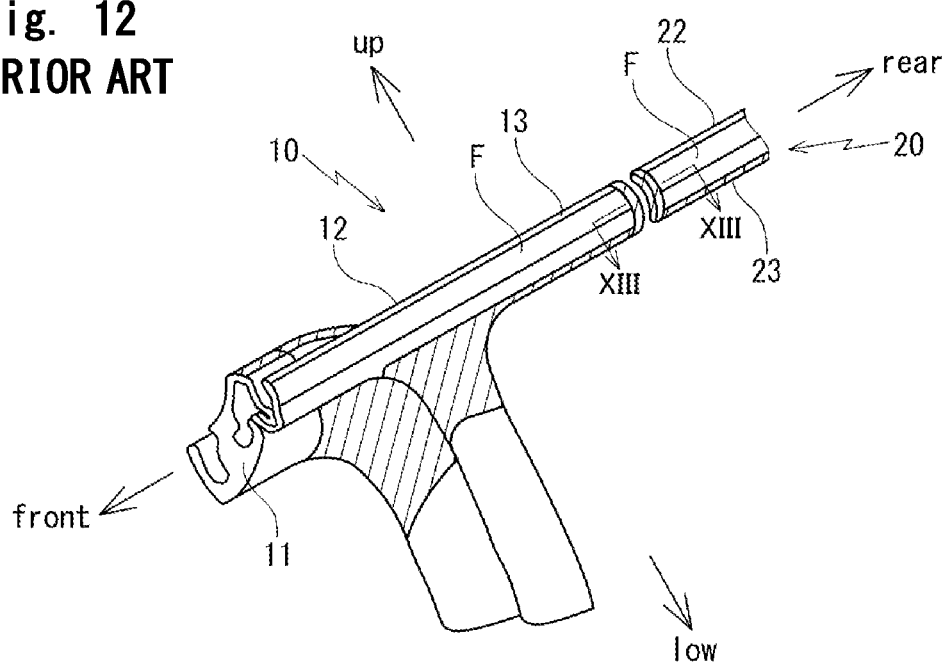
FIG. 12 is a perspective view of the principal components of a coupling structure known in the art of a glass run.
Figure 13:
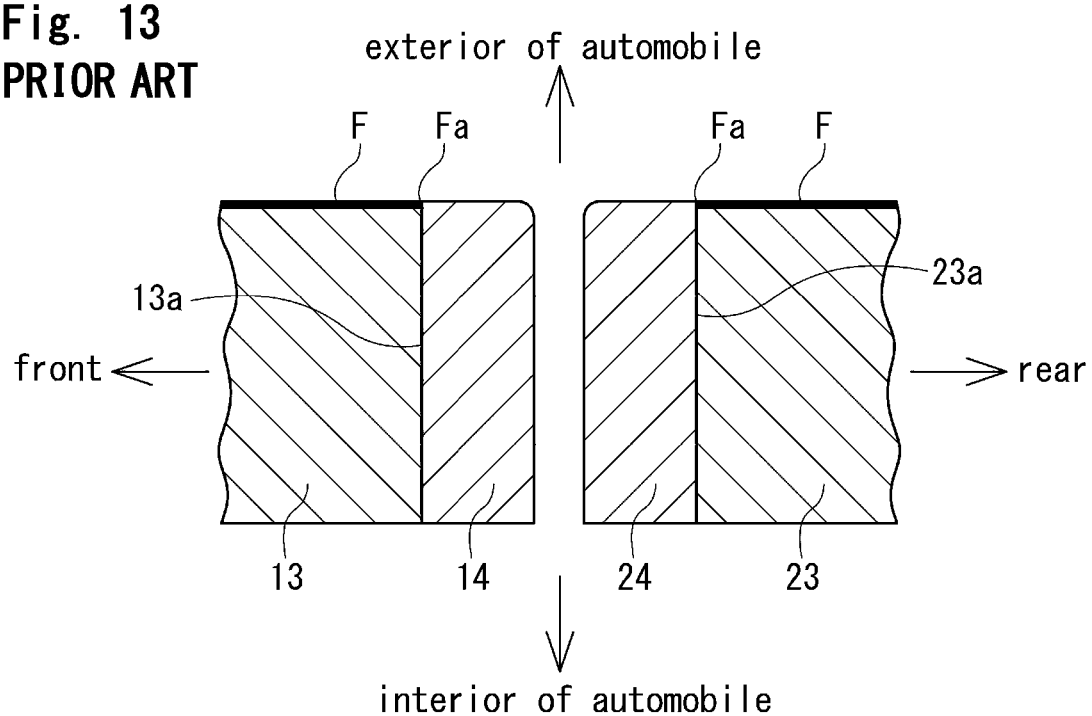
FIG. 13 is an enlarged cross-sectional view of the glass run taken along line XIII-XIII of FIG. 12.

In the present embodiment, the glass runs 50, 70 are of so-called "hidden type". The glass run 50 couples to the frame 3 of the front door 1, to cover up the frame 3 from the exterior of the automobile. The decorative film F covers the extended part 53. The glass run 70 couples to the frame 4 of the rear door 2, to cover up the frame 4 from the exterior of the automobile. The decorative film F covers the extended part 73. The glass run is not limited to the "hidden type". In some embodiments, the glass run has the configuration illustrated in FIG. 12. In this modification, an installation member 11 couples to the frame from a lower part. The decorative film F is attached to an extended part 13 of a decorative lip 12. In the same manner, the decorative film F is attached to an extended parts 23 of a decorative lip 22. The decorative lips 12, 22 are closer to the exterior of the automobile than the installation member 11.

Figure 10:
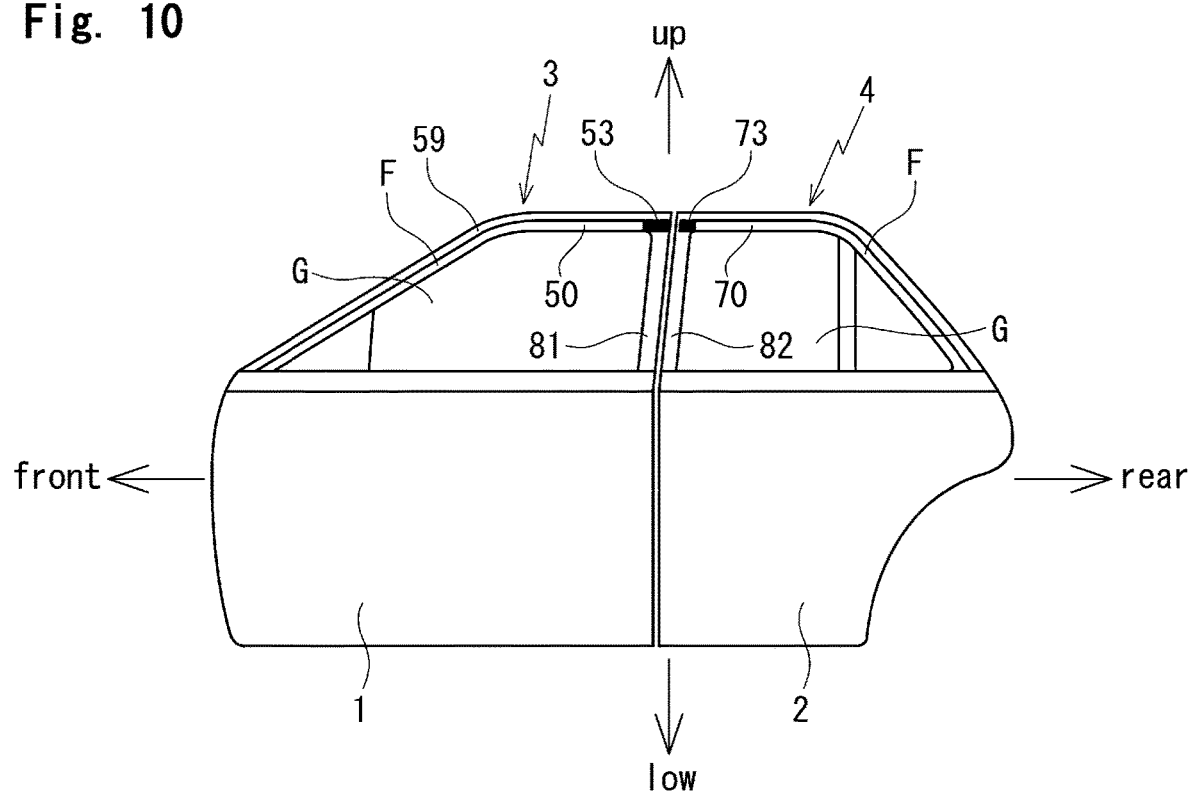
FIG. 10 is a side view of doors according to the embodiment of the present invention of an automobile.
Figure 11:
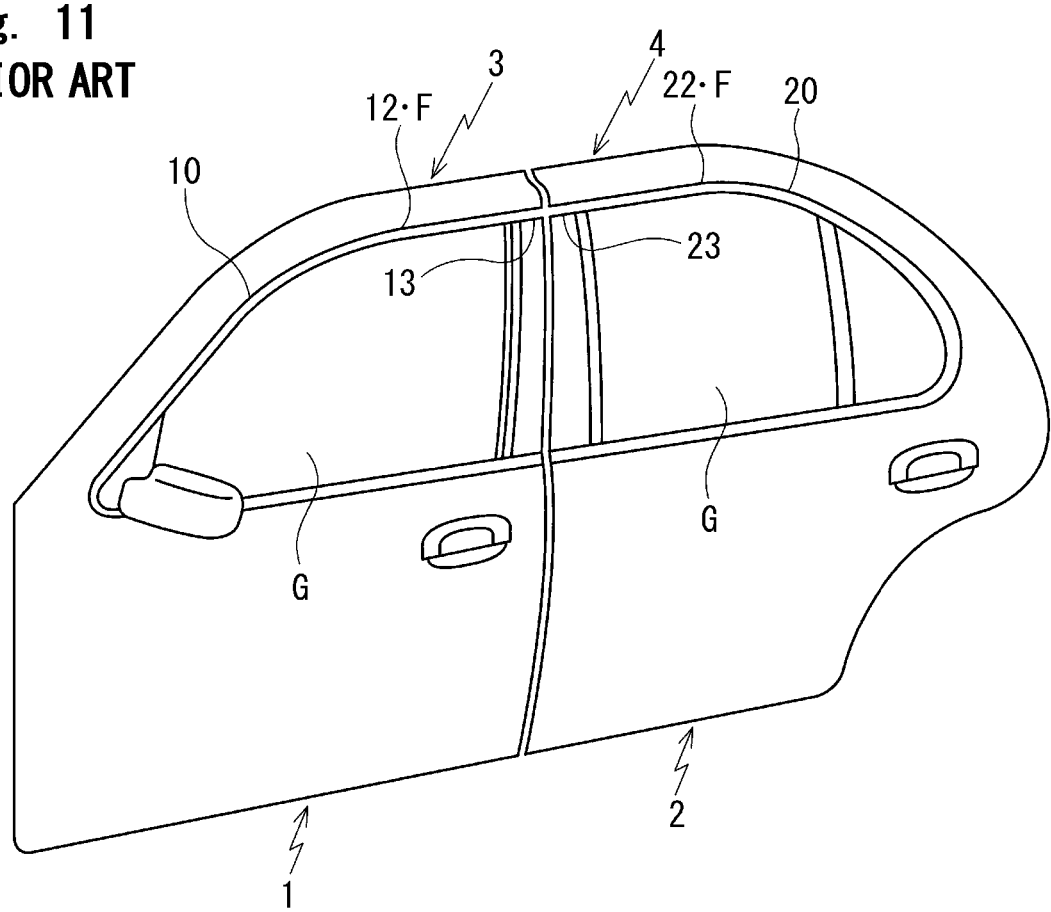
FIG. 11 is a side view of doors known in the art of an automobile.

In the present embodiment, as illustrated in FIG. 5 and FIG. 10, the extended part 53 and the extended part 73 are faced each other on the parting portion between the front door 1 and the rear door 2. The use of the extended part is not limited to the parting portion. In some embodiments, the extended part is used where two adjacent extended parts are not faced each other, including a die-molded part on a front part of the front door 1 and a die-molded part on a rear part of the rear door 2.

In the present embodiment, as illustrated in FIG. 5 and FIG. 10, the extended part 53 on the front door 1 and the extended part 73 on the rear door 2 are closer to the parting portion than the second extrusion molded parts. The positions of the extended parts 53, 73 are not limited. In some embodiments, the extended parts 53, 73 are aligned with the second extrusion molded parts.

We claim:

1. A glass run for a door of an automobile, for guiding a door glass in a frame, the glass run comprising:
   an installation member configured to couple to the frame;
   a body which forms a channel;
   an extended part formed by extending an outer-cabin side of the installation member in a direction away from the door from an end of an upper side of the door; and a decorative film bent on an end of the extended part toward an inner-cabin side of the extended part from an outer-cabin side, the decorative film being configured to cover an end surface of the extended part, wherein:

the decorative film has an upper end and a lower end bent to incline toward an interior of the automobile from an exterior or form arcs;

part of the upper end and part of the lower end of the decorative film are removed by a predetermined distance from the end surface of the extended part to reduce a width in an upper and lower direction of a remainder part of the decorative film;

first ends of cut-off parts of the upper end and the lower end of the decorative film are chamfers formed into curved corner parts, the first ends being opposite second ends of the cut-off parts, the second ends being closer to the end surface of the extended part; and a cover member which is composed of die-molding material fills up the chamfers.

2. The glass run as claimed in claim 1, further comprising a base configured to attach the decorative film to the extended part, the base being composed of hard resin higher in rigidity than the extended part, wherein the base is bent on the end of the extended part toward an interior of the automobile from an exterior to cover the end surface of the extended part, the base being bent alongside the decorative film which is bent on the end of the extended part toward the interior of the automobile.

3. The glass run as claimed in claim 2, further comprising an insert panel embedded between the base and the end surface of the extended part, the base being bent.

4. A glass run for a door of an automobile, for guiding a door glass in a frame, the glass run comprising:

an installation member configured to couple to the frame;
a body which forms a channel;
an extended part formed by extending an outer-cabin side of the installation member in a direction away from the door from an end of an upper side of the door; and
a decorative film bent on an end of the extended part toward an inner-cabin side of the extended part from an outer-cabin side, the decorative film being configured to cover an end surface of the extended part, wherein:

the decorative film has an upper end and a lower end bent to incline toward an interior of the automobile from an exterior or form arcs;

part of the upper end and part of the lower end of the decorative film are removed by predetermined distance from the end surface of the extended part to reduce a width in an upper and lower direction of a remainder part of the decorative film;

first ends of cut-off parts of the upper end and the lower end of the decorative film are chamfers formed into curved corner parts, the first ends being opposite second ends of the cut-off parts, the second ends being closer to the end surface of the extended part than the first ends; and the chamfers start from where the cut-off parts of the decorative film intersect a crease along which a part of the extended part covered by the remainder part of the decorative film is bent toward the interior of the automobile.

5. The glass run as claimed in claim 4, further comprising a base configured to attach the decorative film to the extended part, the base being composed of hard resin higher in rigidity than the extended part, wherein the base is bent on the end of the extended part toward the interior of the automobile from the exterior to cover the end surface of the extended part, the base being bent alongside the decorative film which is bent on the end of the extended part toward the interior of the automobile.

6. A glass run for a door of an automobile, for guiding a door glass in a frame, the glass run comprising:

an installation member configured to couple to the frame;
a body which forms a channel;
an extended part formed by extending an outer-cabin side of the installation member in a direction away from the door from an end of an upper side of the door; and
a decorative film bent on an end of the extended part toward an inner-cabin side of the extended part from an outer-cabin side, the decorative film being configured to cover an end surface of the extended part, wherein:

the decorative film has an upper end and a lower end bent to incline toward an interior of the automobile from an exterior or form arcs;

part of the upper end and part of the lower end of the decorative film are removed by predetermined distance from the end surface of the extended part to reduce a width in an upper and lower direction of a remainder part of the decorative film;

first ends of cut-off parts of the upper end and the lower end of the decorative film are chamfers formed into curved corner parts, the first ends being opposite second ends of the cut-off parts, the second ends being closer to the end surface of the extended part; and the chamfers start from a position opposite the end surface of the extended part relative to where the cut-off parts of the decorative film intersect a crease along which a part of the extended part covered by the remainder part of the decorative film is bent toward the interior of the automobile, such that the crease is between the position from where the chamfers start and the end surface of the extended part.

7. The glass run as claimed in claim 6, further comprising a base configured to attach the decorative film to the extended part, the base being composed of hard resin higher in rigidity than the extended part, wherein the base is bent on the end of the extended part toward the interior of the automobile from the exterior to cover the end surface of the extended part, the base being bent alongside of the decorative film which is bent on the end of the extended part toward the interior of the automobile.

8. The glass run as claimed in claim 5, further comprising an insert panel embedded between the base and the end surface of the extended part, the base being bent.

9. The glass run as claimed in claim 6, further comprising an insert panel embedded between the base and the end surface of the extended part, the base being bent.

* * * * *